(12) United States Patent
Kuris et al.

(10) Patent No.: US 10,678,677 B1
(45) Date of Patent: Jun. 9, 2020

(54) CONTINUOUS DEBUGGING

(71) Applicant: Red Hat Israel, Ltd., Ra'anana (IL)

(72) Inventors: Eran Kuris, Holon (IL); Alexander Stafeyev, Bet shemes (IL); Arie Bregman, Gan Yavne (IL)

(73) Assignee: Red Hat Israel, Ltd., Ra'anana (IL)

(*) Notice: Subject to any disclaimer, the term of this patent is extended or adjusted under 35 U.S.C. 154(b) by 0 days.

(21) Appl. No.: 16/244,288

(22) Filed: Jan. 10, 2019

(51) Int. Cl.
*G06F 9/44* (2018.01)
*G06F 11/36* (2006.01)
*G06F 8/41* (2018.01)

(52) U.S. Cl.
CPC ............ *G06F 11/3664* (2013.01); *G06F 8/41* (2013.01); *G06F 11/3624* (2013.01); *G06F 11/3644* (2013.01)

(58) Field of Classification Search
CPC .... G06F 8/41; G06F 11/3624; G06F 11/3644; G06F 11/3664
USPC .................................................. 717/124–135
See application file for complete search history.

(56) References Cited

U.S. PATENT DOCUMENTS

| | | | | |
|---|---|---|---|---|
| 5,179,702 A * | 1/1993 | Spix | ............ | G06F 8/41 718/102 |
| 6,195,676 B1 * | 2/2001 | Spix | ............ | G06F 8/41 718/107 |
| 6,966,051 B2 | 11/2005 | McBrearty et al. | | |
| 7,134,115 B2 | 11/2006 | Kawai et al. | | |
| 8,566,654 B2 * | 10/2013 | Cinarkaya | ............ | G06F 11/0709 714/57 |
| 8,640,105 B2 | 1/2014 | Yaffe | | |
| 8,874,883 B2 * | 10/2014 | Williams | ............ | G06F 9/30189 712/227 |
| 9,065,854 B2 * | 6/2015 | Goyal | ............ | G06F 9/455 |
| 9,104,798 B2 * | 8/2015 | Mohindra | ............ | G06F 11/3664 |
| 2013/0055217 A1 | 2/2013 | Boxall et al. | | |
| 2018/0143852 A1 * | 5/2018 | Ballantyne | ............ | G06F 9/5027 |
| 2019/0327135 A1 * | 10/2019 | Johnson | ............ | H04L 67/34 |

* cited by examiner

*Primary Examiner* — Ted T. Vo
(74) *Attorney, Agent, or Firm* — K&L Gates LLP

(57) ABSTRACT

Continuous debugging is disclosed. For example, a source code repository stores a first project. A processor is configured to execute a job scheduler, which includes a debugger. The job scheduler receives a request to execute a job, which includes executing a first executable code. A guest is instantiated. The first project is copied as a second project. The second project is compiled into the first executable code. The guest is instructed to execute the job including the first executable code. The debugger intercepts an error caused by executing the first executable code. The debugger updates the second project by inserting a breakpoint into the second project based on the error. The updated second project is compiled into a second executable code. The guest is instructed to re-execute the job including executing the second executable code. Execution of the second executable code is paused at the breakpoint.

20 Claims, 11 Drawing Sheets

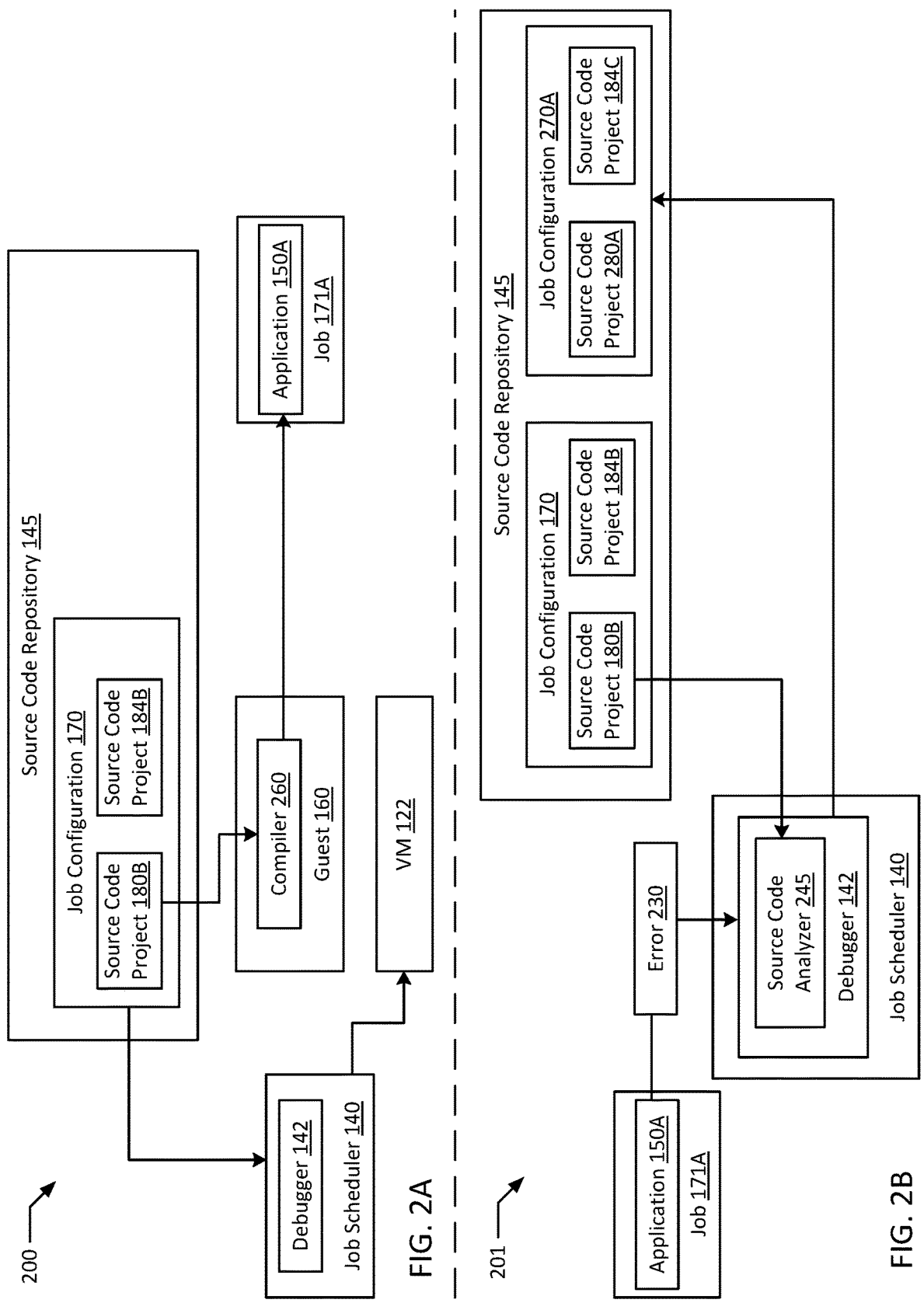

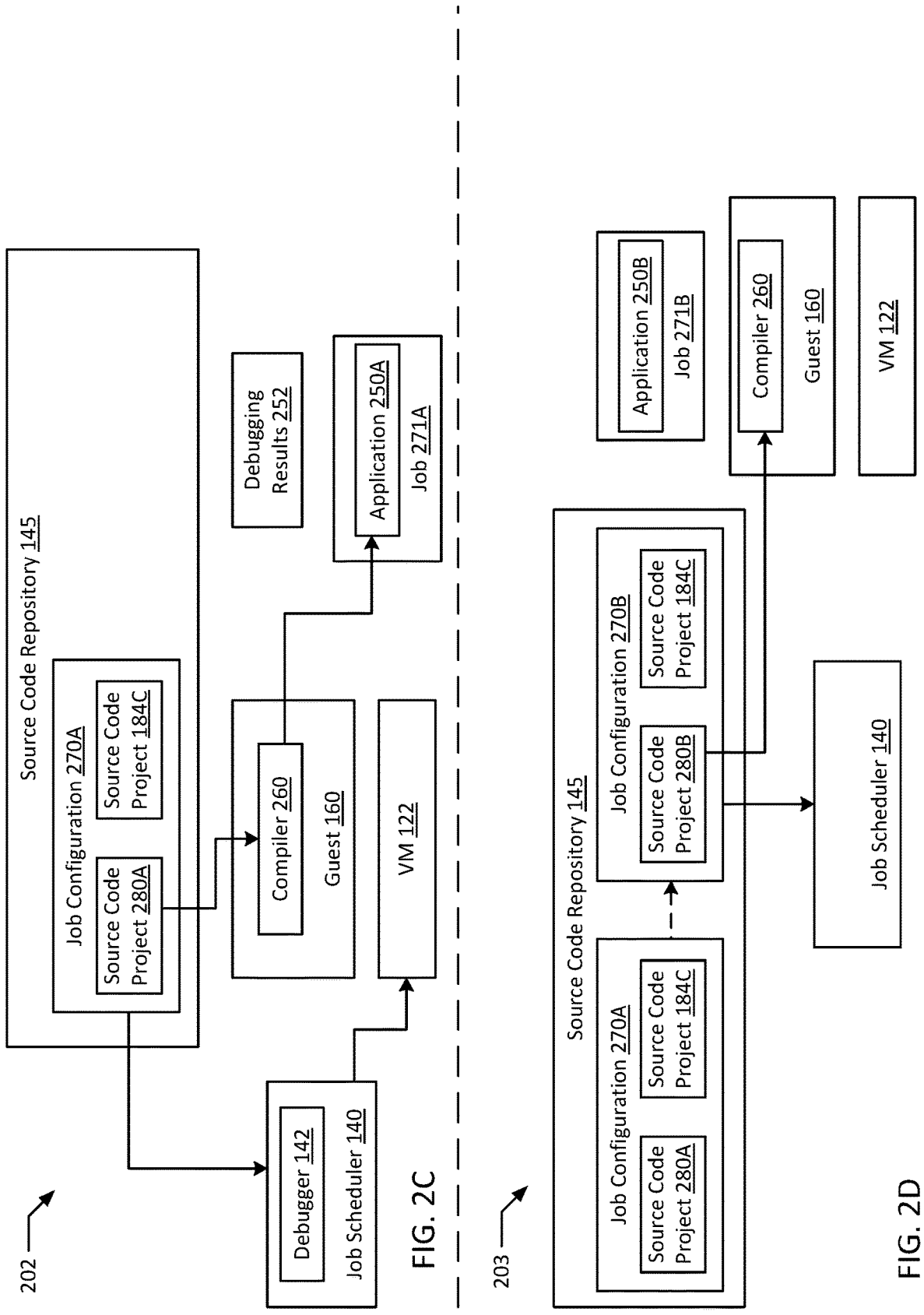

CONTINUOUS DEBUGGING

BACKGROUND

The present disclosure generally relates to developing and executing computer programs in computer systems. For rapid development and deployment of software, developers may often seek to integrate existing code modules and even entire software programs into new software programs and/or jobs executing multiple programs. A job may be configured to take the output of one program and feed that output into a second program as an input into the second program. In addition, for scalability and efficiency reasons, many computer systems employ virtualized guests such as virtual machines and containers to execute computing tasks performed by the computing systems, such as for hosting applications. Typically, guests such as containers and virtual machines may be launched to provide extra compute capacity, while isolating compute resources used by different users and tenants away from those of other users. Employing guests enables rapid scaling of applications to the volume of traffic requesting the services provided by those applications. In addition, guests typically allow for increased deployment flexibility since guests may typically be deployed in a variety of hardware environments. Multiple guests may also be clustered together to perform more complex functions than the respective guests are capable of performing individually.

SUMMARY

The present disclosure provides a new and innovative system, methods and apparatus for continuous debugging. In an example, a source code repository stores a plurality of source code projects, including a first project. A processor is configured to execute a job scheduler, which includes a debugger. The job scheduler receives a request to execute a job, which includes executing a first executable code. A guest is instantiated and the first project is copied to the source code repository as a second project. The second project is compiled into the first executable code. The guest is instructed to execute the job including the first executable code. The debugger intercepts an error caused by executing the first executable code. The debugger updates the second project by inserting a breakpoint into the second project based on the error. The updated second project is compiled into a second executable code. The guest is instructed to re-execute the job including executing the second executable code. Execution of the second executable code is paused at the breakpoint.

Additional features and advantages of the disclosed method and apparatus are described in, and will be apparent from, the following Detailed Description and the Figures.

BRIEF DESCRIPTION OF THE FIGURES

FIGS. 2A-D are block diagrams of job scheduling in a continuous deployment environment implementing a debugging system according to an example of the present disclosure.

DETAILED DESCRIPTION OF EXAMPLE EMBODIMENTS

Figure 1:
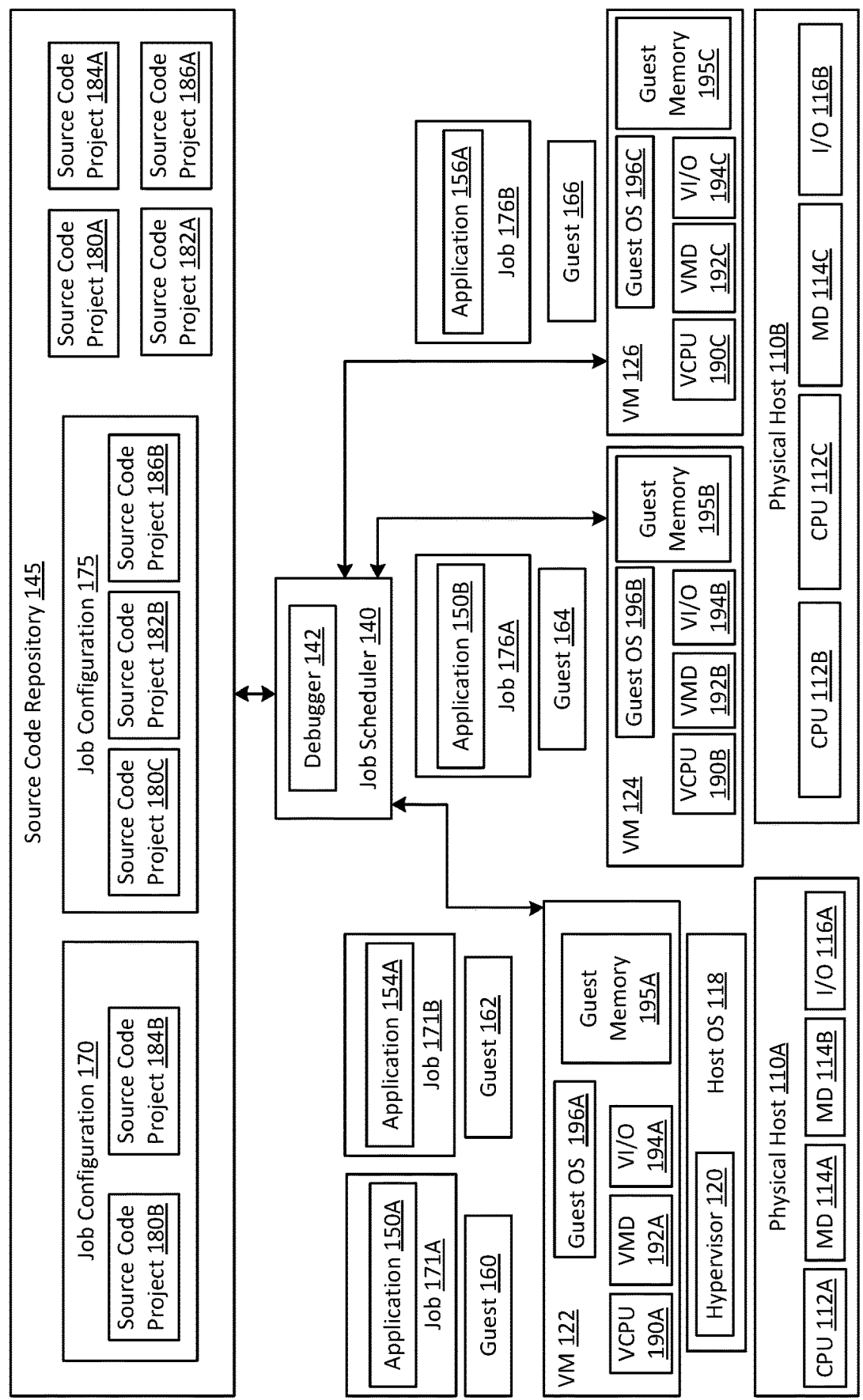
FIG. 1 is a block diagram of a debugging system according to an example of the present disclosure.

In many computer systems, physical hardware may host guests such as virtual machines and/or containers. In an example, a virtual machine ("VM") may be a robust simulation of an actual physical computer system utilizing a hypervisor to allocate physical resources to the virtual machine. Software applications developed in a variety of programming languages are executed on physical hosts or virtual hosts (e.g., VMs and containers). Instead of redeveloping functionality of existing software programs, programmers typically seek to integrate new programs with these existing programs to utilize the features of the existing programs, for example, by incorporating code from a source code repository into a new program or service. There are typically advantages to streamlining and shortening the software development lifecycle ("SDLC"), which results in shortening the time between code being written and updates being deployed to consumers. Some commonly implemented shortened SDLCs include the "Continuous Integration", "Continuous Delivery", and "Continuous Deployment" models of software development. In Continuous Integration, changes are typically merged into an application project's main code base as often as possible (e.g., after completing work on each module). These changes are then built into an executable program that is run against a standard test suite, typically a set of automated tests specific to the application. Each change is therefore incremental and multiple developers may work on the same codebase with assurance that their incremental changes will work with those of their colleagues before a final release is pushed to consumers. In Continuous Delivery, Continuous Integration is further supplemented by the capability of releasing code that has passed through testing on demand. Typically this may be achieved through automating the release process. With Continuous Delivery, each release is typically small so the universe of code to debug if there is a problem is typically limited, allowing for agile updates. In Continuous Deployment, code changes that pass through automated testing are automatically released as updates, typically providing the fastest updates to users and the fastest feedback from users for new features. Continuous Integration, Continuous Delivery, and/or Continuous Deployment environments may be referred to as CICD environments.

In some typical implementations, multiple programs and services built by integrating different programs together may be combined into comprehensive jobs that perform multiple data manipulations on various inputs before generating an output. These programs combined into jobs may be written in different programming languages that have incompatible syntaxes with each other. These jobs may require many hours (e.g., 2 to 24 or more hours) to fully execute. In a typical example, a job may be divided into discrete functions performed by its component programs, where after each step of the job is complete, computing resources (e.g., containers hosting individual programs and services of the job) may be reclaimed and returned to a pool of resources. Therefore, all of the computing resources used by the job except for persistent storage to store the output of the job may be provided by transient guests. In an example, the majority of the components (e.g., programs and services) incorporated in a job may be functioning code that has already been debugged and committed as working projects to a source code repository. In such cases, a new job may be composed entirely of components that individually perform their designed functions correctly without error. However, in many cases, some undiscovered incompatibility between various components, or some unhandled exception within a component that may not be apparent when the component is executed individually, may end up causing a job to fail many hours into execution, which may result in significant loss of time and computing efficiency, especially if such failures occur when the job is not actively monitored by an engineer (e.g., in the middle of the night). Since the individual components in these jobs have typically already been tested and debugged, these errors may often only occur during production usage, especially where the errors require specific contingent execution states to occur. The long execution times of these jobs may prevent rigorous pre-deployment testing to find edge cases especially in CICD environments.

Systems and methods described in the present disclosure overcome the inefficiencies resulting from unexpected failures of applications, services, and jobs, especially in CICD environments by integrating an automated debugger into a job scheduler that allocates processing tasks and computing resources to handle these processing tasks. In an example, a job may be composed of many programs configured to execute in a particular process flow. In the example, each of these component programs may have already been independently tested, and the combined job may be expected to perform its designed function without error. The job scheduler instantiates a container to begin execution of the job, where the container is configured to send any error messages generated by the job to the debugger, and the container is configured to self terminate if it is no longer processing data (e.g., after the job is complete). In an example, a few hours into processing, the job enters a phase where two separate applications are configured to process data in parallel, with both outputs being inputs for a third application. However, due to a lack of system resources, a second container that was supposed to host one of the two applications is not allocated on time, delaying processing, resulting in the third application triggering a timeout waiting for one of its two inputs. In such an example, the job failed even though none of the individual applications in the job failed to perform as designed. The debugger intercepts the error message from the third application triggered by the timeout, and sends instructions to first keep the container(s) hosting the job from being terminated (e.g., due to not processing data after the failure). The debugger then retrieves the source code of the third application from a source code repository and determines the programming language of the third application. Determining the programming language of the third application allows the debugger to perform operations on the source code of the third application (e.g., interpret the source code, insert debugging configurations, insert breakpoints etc.) in a syntax compatible with the third application. The debugger also determines a location in the source code of the third application that generated the error based on the error message received. The debugger then adds a breakpoint in the third application's source code, saves a copy of the third application with the breakpoint, and recompiles the third application to add the updated third application into the job's configuration. The job scheduler then re-executes the job on the suspended containers, the re-execution being paused at the breakpoint for a developer to review the execution state of the job at the failure point. In some examples, the intermediary results of various steps of an executing job may be cached so that the results may be fed into the next step rather than re-executing the earlier step to streamline re-execution. In some examples the debugger may be configured to attempt automated remediation, for example, in the timeout error scenario above, the debugger may be configured to lengthen or remove the timeout.

In an illustrative example, an engineer may start a new job expected to take eight hours before leaving the office at night. The job scheduler, detecting that the job is a new configuration, may be configured to execute new job configurations with debugging set to active. In such a scenario, if the job fails three hours into execution, rather than coming to the office in the morning and needing to re-execute the job for three hours (e.g., due to the guests hosting the failed job being reclaimed), the engineer instead finds that the debugger has already inserted a breakpoint related to the failure, and that a guest is already suspended at the point of failure for evaluation and remediation. By implementing a job scheduler with an automated debugger, many hours of SDLC delay may be alleviated. In addition, a job scheduler configured to execute jobs in a debugging mode where outputs are cached allows for significantly reduced processing when re-execution of jobs for debugging purposes is required, thereby improving computing efficiency and reducing required processor cycles. In addition, the automated debugger disclosed herein may be configured to monitor jobs that have a history of successful execution. In these cases, the debugger may be configured to detect any errors that may have occurred in job execution, to react to these detected errors by generating inserting a breakpoint based on the detected error, and to execute the corresponding updated job with the inserted breakpoint in order to reproduce the detected error. If the error is detected before the computing resources allocated to the guest are reclaimed, the guest may also be prevented from being terminated to preserve the execution state causing the error for further troubleshooting. In such cases, execution results of prior tasks in an executing job may also be reused to expedite reaching the failure condition triggering the error, saving significant processing resources for reproducing an error. The automated debugger incorporated into the job scheduler described herein may also be implemented independently of the job scheduler. For example, the automated debugger is configured to detect the programming language of a given source code program and to insert an appropriate breakpoint in the detected programming language. This functionality may significantly reduce debugging times in any software development utility used to build software projects that combine executable code written in different programming languages (e.g., where a library incorporated in a program is written in a different language).

FIG. 1 is a block diagram of a debugging system according to an example of the present disclosure. The system 100 may include one or more physical host(s) 110A-B. Physical hosts 110A-B may in turn include one or more physical processor(s) (e.g., CPUs 112A-C) communicatively coupled to memory device(s) (e.g., MD 114A-C) and input/output device(s) (e.g., I/O 116A-B). As used herein, physical processor or processors 112A-C refer to devices capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit ("CPU").

As discussed herein, memory devices 114A-C refer to volatile or non-volatile memory devices, such as RAM, ROM, EEPROM, or any other device capable of storing data. In an example, memory devices 114A-C may be persistent storage devices such as hard drive disks ("HDD"), solid state drives ("SSD"), and/or persistent memory (e.g., Non-Volatile Dual In-line Memory Module ("NVDIMM")). Memory devices 114A-C may additionally include replication of data to prevent against data loss due to a failure in any one device. This replication may be implemented through, for example, a redundant array of independent disks ("RAID") setup. RAID arrays may be designed to increase performance, to provide live data backup, or a combination of both. As discussed herein, I/O device(s) 116A-B refer to devices capable of providing an interface between one or more processor pins and an external device, the operation of which is based on the processor inputting and/or outputting binary data. CPU(s) 112A-C may be interconnected using a variety of techniques, ranging from a point-to-point processor interconnect, to a system area network, such as an Ethernet-based network. Local connections within physical hosts 110A-B, including the connections between processors 112A-C and memory devices 114A-C and between processors 112A-C and I/O device 116A-B may be provided by one or more local buses of suitable architecture, for example, peripheral component interconnect (PCI).

In an example, physical host 110A may run one or more isolated guests, for example, VM 122, which may in turn host additional virtual environments (e.g., VMs and/or containers), for example, guests 160 and 162. In an example, a container (e.g., guest 160 or 162) may be a guest using any form of operating system level virtualization, for example, Red Hat® OpenShift®, Docker® containers, chroot, Linux®-VServer, FreeBSD® Jails, HP-UX® Containers (SRP), VMware ThinApp®, etc. Containers may run directly on a host operating system (e.g., host OS 118) or run within another layer of virtualization, for example, in a virtual machine (e.g., VM 122). In an example, containers that perform a unified function may be grouped together in a container cluster that may be deployed together (e.g., in a Kubernetes® pod). In an example, a given service may require the deployment of multiple VMs, containers and/or pods in multiple physical locations. In an example, VM 122 may be a VM executing on physical host 110A. In an example, guest 160 and/or guest 162 may be VMs or containers executing on VM 122. In an example, guest 160 may execute job 171A which includes executing application 150A. In an example, application 150A may additionally include executing with one or more layers of additional virtualization. For example, application 150A may execute inside of another guest. In an example, application 150A may be programmed in an interpreted language executing in a specific runtime environment with some of the features of a full fledged virtual guest (e.g., Java Runtime Environment®). In an example, guest 162 also executing on VM 122 may host job 171B (e.g., a second copy of job 171A) at a further point in the execution of the job, so job 171B may be actively executing application 154A rather than application 150A.

System 100 may run one or more guests (e.g., VM 122 guests 160, 162), by executing a software layer (e.g., hypervisor 120) above the hardware and below the VM 122, as schematically shown in FIG. 1. In an example, the hypervisor 120 may be a component of respective host operating system 118 executing on physical host 110A, for example, implemented as a kernel based virtual machine function of host operating system 118. In another example, the hypervisor 120 may be provided by an application running on host operating system 118A. In an example, hypervisor 120 may run directly on physical host 110A without an operating system beneath hypervisor 120. Hypervisor 120 may virtualize the physical layer, including processors, memory, and I/O devices, and present this virtualization to VM 122 as devices, including virtual central processing unit ("VCPU") 190A, virtual memory devices ("VIVID") 192A, virtual input/output ("VI/O") device 194A, and/or guest memory 195A. In an example, another virtual guest (e.g., a VM or container) may execute directly on host OSs 118 without an intervening layer of virtualization. In an example, VM 122 may be a virtual machine and may execute a guest operating system 196A which may utilize the underlying VCPU 190A, VIVID 192A, and VI/O 194A. Processor virtualization may be implemented by the hypervisor 120 scheduling time slots on physical processors 112A such that from the guest operating system's perspective those time slots are scheduled on a virtual processor 190A. VM 122 may run on any type of dependent, independent, compatible, and/or incompatible applications on the underlying hardware and host operating system 118. The hypervisor 120 may manage memory for the host operating system 118 as well as memory allocated to the VM 122 and guest operating system 196A such as guest memory 195A provided to guest OS 196A. In an example, guest OS 196A hosts service 150A, which may be implemented with any suitable form of executable code (e.g., application, program, script, etc.) to provide a specific processing capability. In an example, service 150A may execute directly on guest OS 196A, or service 150A may be further virtualized, for example, in a container or secondary virtual machine.

In an example, VMs 124 and 126 may be similar virtualization implementations to VM 122, but may, for example, execute separate operating systems (e.g., guest OS 196B-C). In an example, guest OSes 196BC may be incompatible with guest OS 196A and/or host OS 118. In an example, guests 124 and 126 execute on physical host 110B, with VCPU 190B-C, VIVID 192B-C, VI/O 194B-C, and guest memory 195B-C virtualizing access to physical CPU 112B-C, MD 114C, and I/O 116B. In an example, VMs 124 and 126 may host guests 164 and 166 respectively, with guest 164 hosting job 176A (e.g., a different job from jobs 171A-B) which includes executing application 150B (e.g., another copy of application 150A), and guest 166 hosting job 176B (e.g., a second copy of job 176A), at a further execution point in the job, where job 176B is actively executing application 156A.

In an example, a guest virtualization orchestrator (e.g., Red Hat® OpenShift®, Kubernetes®) managing virtual compute resources for system 100. In an example, job scheduler 140 may be integrated with the guest virtualization orchestrator to instantiate guests to execute jobs. In an example, debugger 142 is an automated debugger included in job scheduler 140 that intercepts errors from executing jobs to automatically insert debugging language (e.g., breakpoints) into the source code of applications generating errors (e.g., source code projects 180A-C, 182A-B, 184A-B, 186A-B). In an example, debugger 142 is further configured with automated remediation capabilities. For example, an orchestrator may include a guest scheduler and a network storage scheduler (e.g., Rook®). In the example, the network storage scheduler may be a storage cluster orchestrator managing the deployment of a distributed storage solution (e.g., Red Hat® Ceph®, OpenStack® Swift, Amazon S3®, etc.) that may additionally employ a distributed file system (e.g., Red Hat® GlusterFS®) providing storage in the form of distributed storage volumes deployed across multiple storage hosts (e.g., VMs 122, 124, and 126). In an example, any form of suitable network for enabling communications between computing devices of system 100 (e.g., physical hosts 110A-B, VMs 122, 124, and 126, guests 160, 162, 164, and 166). For example, a public network (e.g., the Internet), a private network (e.g., a local area network (LAN) or wide area network (WAN)), or a combination thereof may be employed to connect the component parts of the system (e.g., physical hosts 110A and 110B and their respective guests) to each other. In an example, the various software components of system 100 (e.g., VMs 122, 124, and 126, guests 160, 162, 164, 166, jobs 171A-B, 176A-B, applications 150A-B, 154A, 156A, job scheduler 140, debugger 142, etc.) may be implemented via any suitable form of computing module (e.g., application, executable, script, hardware module, etc.).

In an example, source code storage 130, image repository 150, signature repository 145, toolchain storage 170, and/or application archive 180 may be any form of suitable storage system for storing data and/or metadata appropriate to each respective storage, for example a relational database. The source code storage 130, image repository 150, signature repository 145, toolchain storage 170, and/or application archive 180 may be stored in a database associated with a database management system ("DBMS"). A DBMS is a software application that facilitates interaction between the database and other components of the system 200. For example, a DMBS may have an associated data definition language describing commands that may be executed to interact with the database. Examples of suitable DMBS's include MariaDB®, PostgreSQL®, SQLite®, Microsoft SQL Server® available from MICROSOFT® CORPORATION, various DBMS's available from ORACLE® CORPORATION, various DBMS's available from SAP® AG, IBM® DB2®, available from the INTERNATIONAL BUSINESS MACHINES CORPORATION, etc. In an example, a relational database may be implemented with add-on packages and/or services for additional functionality and security (e.g., Red Hat Database®). In an example, source code storage 130, image repository 150, signature repository 145, toolchain storage 170, and/or application archive 180 may be stored in a database organized as a formal database with a schema such as a relational schema with defined tables, indices, links, triggers, various commands etc. In some examples, source code storage 130, image repository 150, signature repository 145, toolchain storage 170, and/or application archive 180 may not be organized as a formal database, but may instead be an alternative storage structure capable of holding the information stored in source code storage 130, image repository 150, signature repository 145, toolchain storage 170, and/or application archive 180, including but not limited to a file, folder, directory, registry, array, list, etc. In an example, one or more of source code storage 130, image repository 150, signature repository 145, toolchain storage 170, and/or application archive 180 may be combined into combined storage repositories. For example, image repository 150 and toolchain storage 170 may be combined, and source code storage 130 and signature repository 145 may be combined.

In an example, source code repository 145 may store source code projects 180A, 182A, 184A, and 186A. In an example, source code repository 145 may additionally store job configurations (e.g., job configurations 170 and 175) that incorporate source code projects stored in source code repository 145 (e.g., source code projects 180B-C, 182B, 184B, 186B). In an example, a job configuration may be implemented with any suitable structure for implementing a process flow of processing tasks (e.g., with a jenkins file). In an example, source code projects 180A, 182A, 184A, and/or 186A may be implemented in the same or in different computer programming languages. In an example, job configurations 170 and 175 may include full copies of their incorporated source code projects, or some form of compression and/or deduplication may be implemented for storage efficiency. For example, source code project 180B may be a virtual reference to source code project 180A, or a copy-on-write copy of source code project 180A. In an example, source code repository 145 may be implemented as a software configuration management system, with change controls and change branching and merging features for source code projects. In an example, source code repository 145 may be organized by project, with each incremental saved change being attributed to an account submitting the change. In an example, job scheduler 140 may be further associated with an image repository storing image files for instantiating guests (e.g. guests 160, 162, 164, and/or 166) for hosting jobs.

In an example, source code repository 145 and/or an image repository storing image files may be implemented in or as a suitable type of database, for example, a relational database, which may be associated with a database management system (DBMS). A DBMS is a software application that facilitates interaction between the database and other components of the physical hosts 110A-B, VMs 122, 124, or 126, guests 160, 162, 164, or 166, job scheduler 140 and/or debugger 142. For example, a DMBS may have an associated data definition language describing commands that may be executed to interact with the database. Examples of suitable DMBS's include MariaDB®, PostgreSQL®, SQLite®, Microsoft SQL Server® available from MICROSOFT® CORPORATION, various DBMS's available from ORACLE® CORPORATION, various DBMS's available from SAP® AG, IBM® DB2®, available from the INTERNATIONAL BUSINESS MACHINES CORPORATION, etc. In an example, source code repository 145 may be configured as a formal database with a schema such as a relational schema with defined tables, indices, links, triggers, various commands etc. In some examples, source code repository 145 may not be configured as a formal database, but may instead be an alternative storage structure capable of holding the information and being queried in relation to source code and/or job scheduling requests in system 100, including but not limited to a file, folder, directory, registry, etc.

FIGS. 2A-D are block diagrams of job scheduling in a continuous deployment environment implementing a debugging system according to an example of the present disclosure. In example system 200 illustrated in FIG. 2A, a request to execute a job based on job configuration 170 is received by job scheduler 140. In an example, job configuration 170 may be a new job configuration stored on source code repository 145 that is constructed with two source code projects from source code repository 145 (e.g., source code projects 180B and source code project 184B). In the example, source code projects 180B and 184B are respective copies of source code projects 180A and 184A. In an example, execution metrics for various jobs may be tracked by job scheduler 140 and/or source code repository 145. In the example, due to a lack of successful execution data associated with job configuration 170, job configuration 170 is flagged to be executed in a debug mode, which invokes debugger 142. In some examples, debugger 142 may execute by default. In some examples, different levels of debugging states may be configured. For example, new jobs may be configured to use a debugging state where intermediary outputs and results are cached, and/or where guests hosting the new job are configured not to be automatically terminated. In contrast, jobs with a successful history of execution may be configured with a more reactive level of debugging, where intermediary results are not cached (e.g., to save on memory and/or storage space) and/or where guests are configured to auto-terminate. For example, instead of being actively configured to receive or intercept log messages including errors (e.g., as with a new, untested or minimally tested job), debugger 142 may still be configured to provide more passive monitoring and automated debugging for jobs that have a history of successful execution. Jobs that have successfully executed multiple times without failure may be configured to execute without being interfaced with debugger 142. In such examples, debugger 142 may be configured to monitor error logs for all of the jobs scheduled by job scheduler 140. However, such monitoring may be performed on a delayed, scheduled basis to reduce the processing overhead associated with the monitoring as compared to active monitoring of jobs with less execution history (e.g., jobs expected to have a higher rate of failure). In such examples, detection of an error may be delayed for seconds, minutes, or even hours after the occurrence of the error. However, once detected, debugger 142 may be configured to automatically recreate the execution conditions of the failure with an updated executable code (e.g., with a breakpoint inserted based on the error received). In an example, a job configuration (e.g., job configuration 170) may be configured to immediately copy and store new copies of source code projects referenced by the job configuration. In another example, new copies of source code projects may be stored only in response to failures resulting in source code changes.

In an example, job scheduler 140 identifies that VM 122 has capacity to host a virtual guest 160 (e.g., a container). In the example, guest 160 is a guest instantiated from an image file that includes a compiler 260 compatible with source code project 180B. In the example, after guest 160 is instantiated, job scheduler 140 instructs guest 160 to redirect its error messages to debugger 142. Job scheduler 140 then instructs guest 160 to retrieve job configuration 170 including source code project 180B. Guest 160 begins executing job 171A (e.g., a workflow described by job configuration 170). Source code project 180B is compiled into application 150A by compiler 260 as part of executing job 171A.

Example system 201 illustrated in FIG. 2B depicts a later state of system 200 after application 150A has been compiled. In an example, application 150A begins processing a data input. In an example, the data input may be included in job configuration 170, or may be retrieved from a storage device (e.g., across a network) based on job configuration 170. For example, the data input into application 150A may be stored in a database, and connection information for the database may be stored in job configuration 170. In an example, during the execution of application 150A, an error 230 is generated that results in application 150A failing to correctly process its data input. In an example, application 150A crashes and/or exists after generating error 230. In an example, guest 160 which hosts application 150A is configured to send error messages to debugger 142 (e.g., stderr on guest 160 may be forwarded to debugger 142). In an example, debugger 142 intercepts the error 230 before error 230 is entered into an error log. In an example, debugger 142 also logs error 230. In an example, debugger 142 analyzes the error message of error 230 to determine that error 230 was triggered by application 150A, which is additionally determined to be compiled from source code project 180B. In the example, debugger 142 retrieves source code project 180B from job configuration 170 for analysis by source code analyzer 245. In some examples, source code project 180B may only be a reference to source code project 180A, in which case source code project 180A may be retrieved based on the reference from source code project 180B. In an example, source code analyzer 245 determines a programming language used to code source code project 180B. In the example, this determination may be performed by any suitable method. For example, a header of source code project 180B may be parsed to determine the programming language, or a file extension may be used to determine the programming language. In an example, an identifier of a programming language may be found in the first lines of a source code file (e.g., a process address space ID, a language identifier, a library identifier, etc.). Some programming languages have easily identifiable characteristics, for example, a Perl script would ordinarily start with an installation location of Perl (e.g., #!/usr/bin/perl). In various examples, more involved methods may be implemented, for example, source code analyzer 245 may be equipped with a syntax parser that identifies the programming language used to code source code project 180B based on the syntax of the code (e.g., commands, libraries, and punctuation structure associated with a given programming language). In an example, machine learning may be implemented to enhance the accuracy of such a syntax parser. In an example, syntax parsing may be implemented in place of, or in addition to (e.g., as confirmation) simpler programming language identification methods (e.g., file name and/or header parsing).

In an example, after identifying a programming language associated with source code project 180B, an updated job configuration 270A is created and saved in source code repository 145 by debugger 142. Debugger 142 then adds a breakpoint in source code project 280A (e.g., a copy of source code project 180B) in the identified programming language based on error 230. In an example, source code project 184C is another copy of source code project 184B or a reference to source code project 184A or 184B. For example, error 230 may identify a line of code in source code project 180B that generated error 230. In the example, the breakpoint would be inserted immediately prior to the identified line of code generating the error. In an example, error 230 may be associated with an unhandled exception in application 150A, for example, an exception that is unlikely to occur when application 150A is executed in isolation and therefore missed during quality assurance testing of application 150A. In an illustrative example, a FileLoadException or FileNotFoundException may be triggered if a data store containing the input data into application 150A fails to be mounted correctly, or if application 150A is granted insufficient permissions to the input data. When testing application 150A in isolation, the input test data may have been supplied manually and therefore a straight forward exception may be missed and unhandled resulting in the error. In another example, the line of code that triggered error 230 may be a line of code to invoke a second application and to wait for an output of the second application (e.g., an application compiled from source code project 184B). In such an example, there may be one breakpoint inserted prior to invoking the second application, but a second breakpoint (possibly in a different programming language) may be inserted in the second application's source code if the second application also had a failure (e.g., resulting in the first application triggering a timeout waiting for results).

Example system 202 illustrated in FIG. 2C depicts a later state of system 201. In the example, after job configuration 270A is saved to source code repository 145 with source code project 280A, which includes the breakpoint inserted by debugger 142, job scheduler 140 requests job configuration 270A to be executed as a job (e.g., job 271A). In an example, job configuration 270A overwrites job configuration 170, and job scheduler 140 requests re-execution of job 171A, which triggers the execution of updated job configuration 270A. In an example, job configuration 270A is flagged to be executed in a test environment (e.g., on a newly instantiated special purpose guest with additional debugging configurations). In an example, to speed up execution, job scheduler 140 assigns the new job to guest 160 which is already instantiated. In some examples, guest 160, debugger 142, and/or job scheduler 140 may have cached intermediary processing results of application 150A, allowing re-execution to skip some processing steps. In an example, upon job scheduler 140 instructing VM 122 and/or guest 160 to execute job configuration 270A as job 271A, guest 160 retrieves source code project 280A to be compiled by compiler 260. In the example, source code project 280A is compiled as application 250A, which executes on guest 160 until the inserted breakpoint, at which point execution is paused. In an example, debugging results 252 (e.g., debugging logs) are generated as a result of executing application 250A. For example, application 250A and/or source code project 280A may be additionally flagged to execute in a debugging mode configured with more verbose logging. In some examples, execution of application 250A may be paused at the breakpoint until an engineer intervenes to observe the error occur in real-time for debugging purposes. In such an example, guest 160 may be suspended or hibernated until an engineer is available. In an example, by suspending or hibernating guest 160, computing resources allocated to guest 160 may be significantly reduced. For example, processor and random access memory resources allocated to guest 160 may be reallocated for other purposes until guest 160 is resumed from suspension or hibernation. In an example, the execution state of guest 160 may be preserved in memory (or in persistent storage) for resumption within seconds during suspension or hibernation, while active processing is shut down, thereby reducing power consumption and allowing physical host 110A to re-utilize any allocated but unused computing resources associated with guest 160. In an example where application 250A is paused before invoking a second application that triggered a second error, resuming application 250A may invoke the second application, and execution of the second application may be paused at the second breakpoint inserted into the second application by debugger 142.

Example system 203 illustrated in FIG. 2D depicts system 202 at a later execution state. In an example, system 203 depicts source code project 280A being modified into source code project 280B to remediate error 230. In an example, an engineer may resume execution of suspended application 250A to debug the cause of error 230. In the example, the engineer may update source code project 280A with a bug fix to resolve a root cause of error 230, and then save source code project 280A as source code project 280B in updated job configuration 270B. In an example, job configuration 270B is then re-executed (e.g., by job scheduler 140 assigning job configuration 270B to guest 160). In another example, debugger 142 may be configured to handle certain types of errors automatically without intervention. For example, an unhandled exception such as a FileLoadException may be handled by automatically inserting code to trap the exception and then retry the file load after waiting for a period of time. These retries may be configured to loop, for example, with progressively longer wait times before retrying, and to only generate an error after a set number of failed attempts. In another example, an error based on a timeout expiring may be automatically handled by extending and/or eliminating the timeout. In these cases, the automated remediation by debugger 142 may be tested before pausing execution and suspending guest 160 to allow an engineer to intervene. In either a manual or automated remediation scenario, job scheduler may reschedule the updated job (e.g., as specified by job configuration 270B) to be executed on guest 160 (or another guest). In an example, re-execution on guest 160 may be more efficient due to guest 160 already being instantiated, and in addition due to guest 160 potentially having cached execution results that may allow certain tasks of updated job 271B to be skipped. In an example, compiler 260 compiles updated source code project 280B into application 250B which executes successfully.

Figure 3:
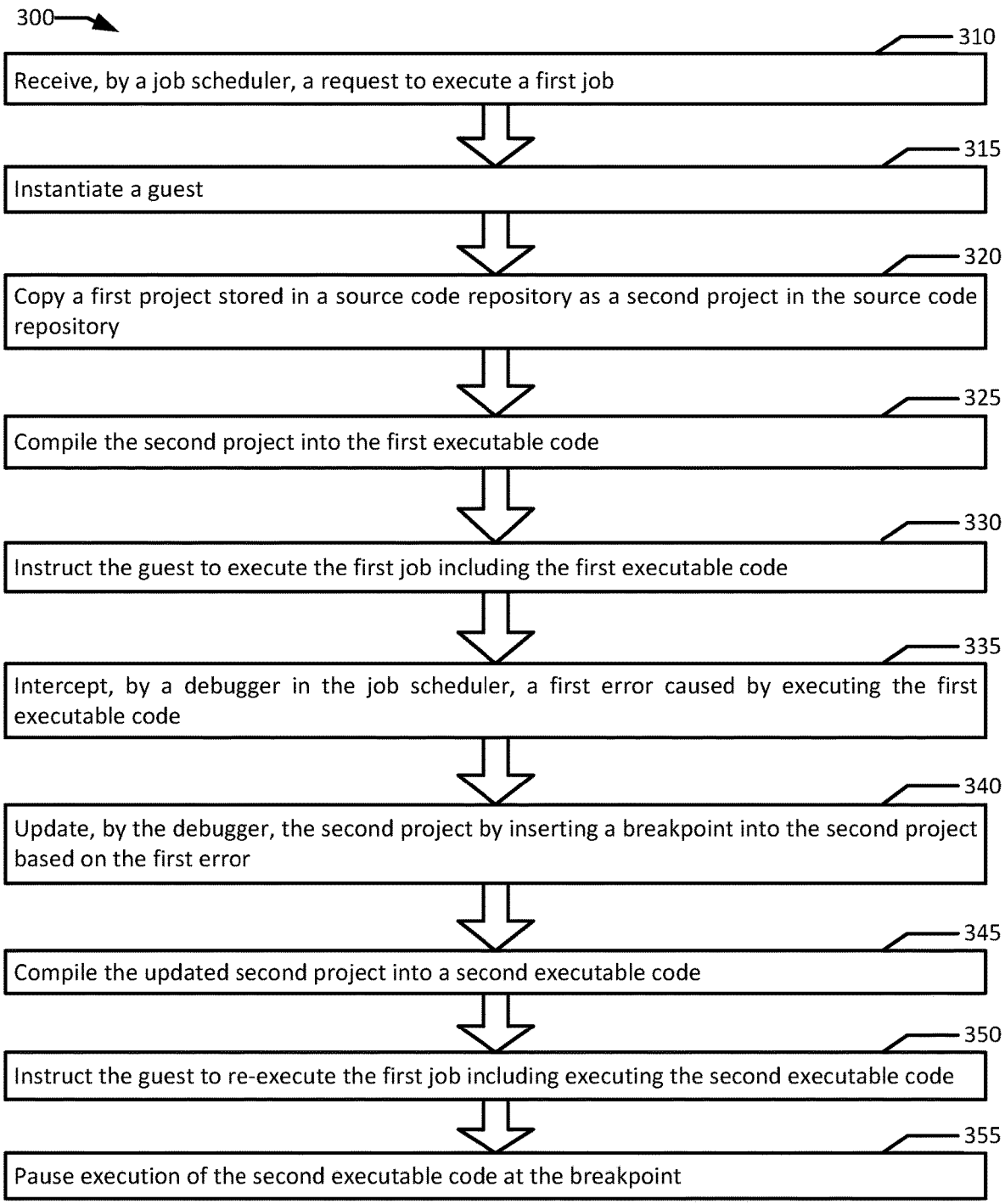
FIG. 3 is flowchart illustrating an example of debugging by a debugging system according to an example of the present disclosure.

FIG. 3 is flowchart illustrating an example of debugging by a debugging system according to an example of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described are optional. The method 300 may be performed by processing logic that may comprise hardware (circuitry, dedicated logic, etc.), software, or a combination of both. In an example, the method 300 is performed by job scheduler 140.

Example method 300 may begin with receiving, by a job scheduler, a request to execute a job (block 310). In an example, executing the job includes executing a first executable code (e.g., application 150A). In an example, a job (e.g., job 171A) may be a set of processing tasks defined by a job configuration (e.g., job configuration 170 corresponding to job 171A). For example, job configuration 170 may specify that input data is retrieved processed by two applications in sequence, first an application compiled from source code project 180B, and then an application compiled from source code project 184B. In an example, job scheduler 140 executes in a continuous integration, continuous development, or continuous deployment environment. In such an example, job configuration 170 may be expected to execute without error, for example, based on both source code projects 180B and 184B passing their respective quality assurance testing processes. In an example, job configuration 170 and job 171A are configured to execute in a cloud environment (e.g., hosted on physical hosts 110A-B), specifically on a virtual guest (e.g., guest 160) hosted in the cloud environment.

A guest is instantiated (block 315). In an example, in response to receiving the request to execute job 171A, job scheduler 140 retrieves job configuration 170, or metadata associated with job configuration 170, to determine a proper execution environment for job 171A. For example, job configuration 170 may include computing resource requirements for a guest executing job 171A (e.g., guest 160). In the example, job scheduler 140 identifies an image file for guest 160. For example, job configuration 170 may include a reference and/or identifier of an image file corresponding to an image file used to launch guest 160. In another example, job scheduler 140 identifies dependencies of source code projects 180B and 184B (e.g., compiler 260) and selects an appropriate image file. In the example, job scheduler 140 determines that VM 122 has sufficient available compute resources (e.g., CPU cores, memory, storage, etc.) to host guest 160. In the example, job scheduler 140 instructs VM 122 to instantiate guest 160.

A first project stored in a source code repository is copied as a second project in the source code repository (block 320). In an example, source code project 180A is a source code project of an independent executable program stored in source code repository 145. In an example, when job configuration 170 is created, source code project 180A is copied as source code project 180B for incorporation into job configuration 170, for example, to ensure that any modifications to source code project 180B are stored separately from the original version (e.g., source code project 180A). In some examples, source code project 180B may be copied with a copy-on-write operation to save storage space, and therefore an independent copy of source code project 180B is only generated after any changes are committed to source code project 180B. In an example, job scheduler 140 is configured to create a new fork in a source code project and/or job configuration in source code repository 145 for new jobs. For example, new jobs may experience often fail and require debugging, in system 100 so job scheduler 140 executes all newly created jobs with debugger 142 set to intercept any errors, and with a new copy of any source code projects incorporated in the job already copied to new files in source code repository 145 so that the new files are ready to be updated with breakpoints.

The second project is compiled into the first executable code (block 325). In an example, source code project 180B is compiled into application 150A by compiler 260. In various examples, compiler 260 may execute on any suitable component within system 100. For example, job scheduler 140 may determine that compiler 260 is not executing in system 100, and select an image file for guest 160 that includes compiler 260. In another example, compiler 260 may execute on a host of source code repository 145 or job scheduler 140, which compiles source code project 180B into application 150A. In such an example, the executable code of application 150A is then transferred to guest 160. In an example, physical host 110A or 110B, or VMs 122, 124, or 126 may execute compiler 260. In some examples, source code project 180B may not need to be compiled, for example, if source code project 180B is a source code project for an interpreted programming language (e.g., Perl®, JavaScript®, etc.). In such an example, instead of launching guest 160 with an image file with a compiler, an image file with a proper interpreter or runtime environment may be selected instead for instantiating guest 160.

The guest is instructed to execute the job including the first executable code (block 330). In an example, job scheduler 140 instructs guest 160 to execute job 171A (e.g., a job based on job configuration 170) including executing application 150A. In an example, executing job 171A may additionally include executing application 154A compiled from source code project 184B. In an example, source code projects 180B and 184B are written in different, incompatible programming languages. For example, as illustrated in FIG. 1, guest 162 executes a second instance of job 171A (e.g., job 171B) that is further along in its execution having progressed from executing application 150A to executing application 154A. In an example, guest 162 executing job 171B does not encounter any errors executing application 150A, for example, due to executing with different inputs as compared to job 171A.

A debugger in the job scheduler intercepts an error caused by executing the first executable code (block 335). In an example, debugger 142 intercepts error 230 caused by executing application 150A. For example, debugger 142 and/or job scheduler 140 configures (or instructs a separate component to configure) guest 160 to redirect errors generated by executing job 171A to debugger 142. In an example, debugger 142 is a component part of job scheduler 140. In an example, a component of debugger 142 or a separate instance of debugger 142 may be included in guest 160. For example, debugger 142 may install a daemon on guest 160 to capture errors (e.g., error 230) and send those errors from the daemon to debugger 142 for handling. In an example, debugger 142 may passively detect errors, for example, by parsing logs generated by jobs scheduled by job scheduler 140. In an example, debugger 142 identifies a programming language of source code project 180B based on application 150A (e.g., an executable code compiled from source code project 180B) generating error 230. In the example, debugger 142 identifies where in source code project 180B error 230 is generated from based on the error message of error 230. In an example, guest 160 may ordinarily be configured to terminate after guest 160 finished a processing task. In an example, in response to intercepting error 230, debugger 142 instructs guest 160 to keep executing rather than terminate, for example, in order to expedite debugging of error 230. For example, the failure execution state of application 150A may be preserved.

The debugger updates the second project by inserting a breakpoint into the second project based on the error (block 340). In an example, debugger 142 inserts a breakpoint into a copy of source code project 180B in the identified programming language of source code project 180B. In some examples, the updated copy of source code project 180B (e.g., with the breakpoint) may overwrite the existing copy of source code project 180B. For example, if source code project 180B has already been copied to a new project, another new copy may be an unnecessary waste of storage because the original unmodified copy of source code project 180B would still be available as source code project 180A. In an example where source code project 180B is a virtual link or reference to source code project 180A, the updated copy of source code project 180B (e.g., with the breakpoint) may be saved as a new project (e.g., source code project 280A).

The updated second project is compiled into a second executable code (block 345). In an example, the updated source code project with the breakpoint (e.g., source code project 280A) is compiled by compiler 260 into application 250A. In an example, job 171A may include having application 150A invoke application 154A, and executing both applications 150A and 154A in parallel. In an example, application 150A and application 154A may or may not execute on the same guest. For example, a new guest may be instantiated to host application 154A compiled from source code project 184B. In some examples, a second guest that hosts a second application invoked by a job (e.g., job 171A) may execute in a different, incompatible environment (e.g., on a different operating system). In such examples, a guest hosting the second job may execute on a different host operating system from the first guest (e.g., guest 160). In an example, errors indicating failures may be received for multiple applications included in a job (e.g., application 150A and 154A). In the example, a second breakpoint in the programming language of source code project 184B may be inserted into a copy of source code project 184B in response to a second error generated by application 154A.

The guest is instructed to re-execute the job including executing the second executable code (block 350). In an example, debugger 142 and/or job scheduler 140 may wait until all executing tasks of job 171A complete execution or fail before re-executing job 171A with debugging settings activated and breakpoints inserted. In an example, job 171A may include numerous tasks. For example, instantiating guest 160 may be an initial task. Compiling source code projects 180B and 184B with appropriate compilers may be tasks. Retrieving input data may be a task, with mounting data storage nodes including databases containing the input data being a separate task. In an example, when a job is re-executed, at least some tasks may be avoided (e.g., instantiating guest 160, mounting persistent storage, retrieving input data, etc.) if their results are preserved. For example, by instructing guest 160 not to exist, guest 160 will not need instantiation, and the input data may still be available from previously being retrieved.

Execution of the second executable code is paused at the breakpoint (block 355). In an example, execution of application 250A is paused at the breakpoint inserted by debugger 142. In an example, executing job 271A up until the breakpoint takes less time than executing job 171A, for example, based on reusable results of repeated successfully executed tasks when executing job 171A. For example, the environment to begin executing application 250A (e.g., guest 160, input data retrieval, etc.) may all be reused from the execution of job 171A because debugger 142 stopped guest 160 from being terminated and its resources reclaimed. In an example, other applications execute prior to application 150A or 250A in the execution of jobs 171A and 271A, and the results of those applications' processing may also be reused, potentially saving hours of processing time, which translates to hours of saved CPU processing time, memory I/O, and network I/O. These re-processing savings in reproducing the failure execution states of failed applications result in significant reductions in power usage and heat generation. In an example, to conserve computing resources, if an engineer is not immediately available to address an error that is not addressable by automated remediation, guest 160 may be suspended with execution of application 250A paused. By suspending guest 160, unused computing resources (e.g., CPU time, unused allocated memory) may be reallocated to other computing tasks thereby increasing computing efficiency on physical host 110A. In the example, guest 160 may be quickly resumed when requested by an engineer allowing the engineer to immediately troubleshoot error 230 rather than discovering a failed job 171A and restarting job 271A from instantiating a new guest (e.g., if guest 160 was terminated). In the example, numerous hours of wasted re-execution processor cycles to return to the execution state triggering the failure in order to debug the error may be saved, especially as compared to systems where executing jobs are not constantly monitored.

In an example, just because a given job triggers an error during one round of execution does not mean that the job will always fail. For example, an application may not be configured to handle an exception where there are insufficient system resources to execute the application (e.g., no resources to launch a new guest). Such an exception may easily be avoided if the application is being manually invoked by an engineer requesting the application to execute independently, and therefore may not be handled properly when the application is triggered automatically, for example, as part of a job configuration. In an example, different input data or execution conditions may allow job 171A, which fails execution on guest 160, to succeed in executing on guest 162 as job 171B. Likewise, a copy of unmodified application 150A incorporated into a different job (e.g., application 150B in job 176A based on job configuration 175) may execute without generating any errors at all. For example, job scheduler 140 may receive a request to execute job configuration 175 which includes source code projects 180C, 182B, and 186B. Job scheduler 140 may instantiate guest 164, which may or may not be based on the same image file as guest 160, and instruct guest 164 to execute job 176A. Source code project 180C, which is another copy of source code project 180A, is compiled as application 150B, and job 176A successfully executes on guest 164, including executing additional applications compiled from source code projects 182B and 186B. In the example, upon successful completion of executing job 176A, the outputs of the job are saved to persistent storage and guest 164 is terminated to reclaim the computing resources allocated to guest 164. These computing resources (e.g., CPU, memory, storage, networking, GPU resources on physical host 110B) are returned to a pool of computing resources available to job scheduler 140 for executing jobs.

Figure 4:
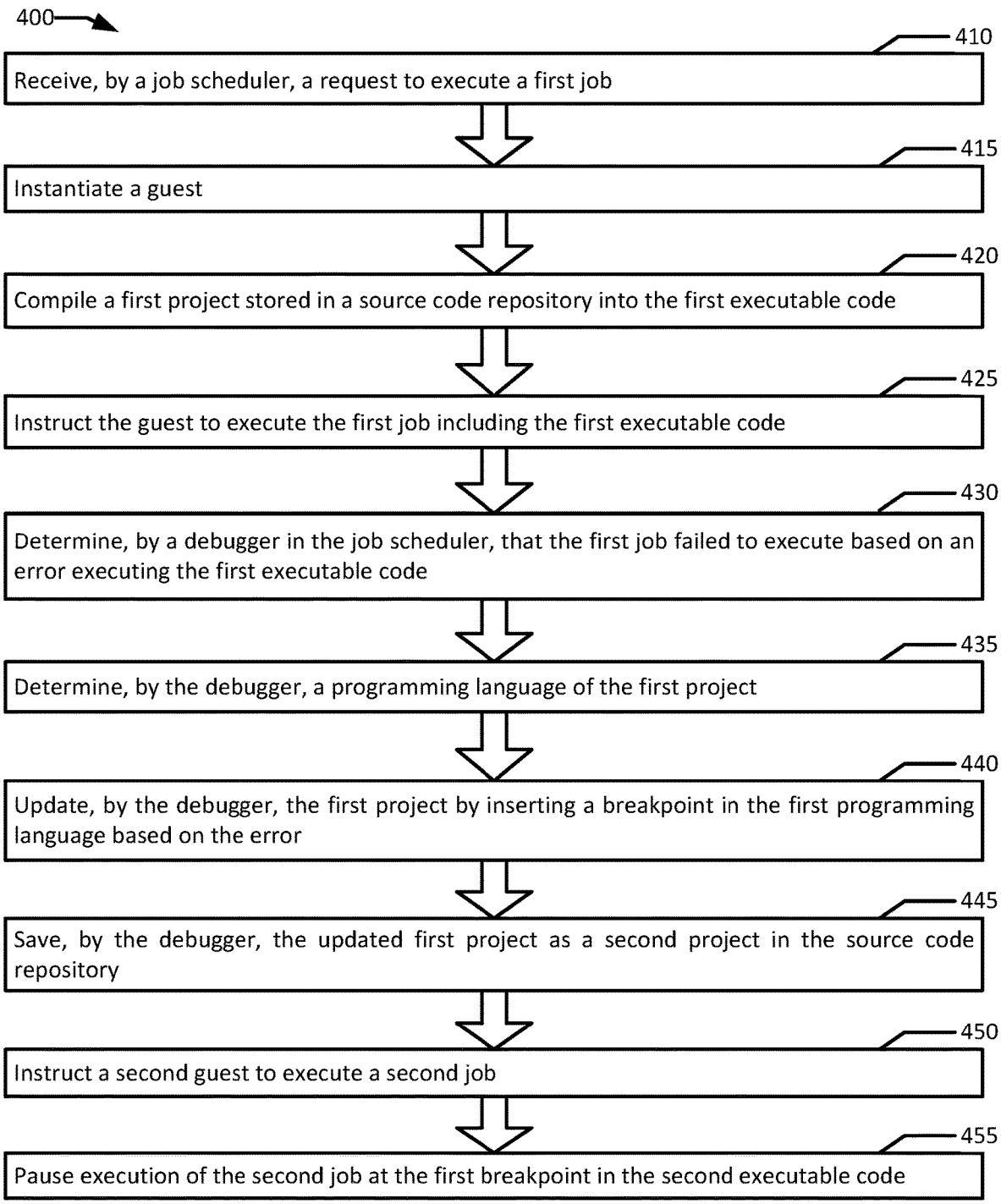
FIG. 4 is flowchart illustrating an example of debugging by a debugging system according to an example of the present disclosure.

FIG. 4 is flowchart illustrating an example of debugging by a debugging system according to an example of the present disclosure. Although the example method 300 is described with reference to the flowchart illustrated in FIG. 4, it will be appreciated that many other methods of performing the acts associated with the method 400 may be used. For example, the order of some of the blocks may be changed, certain blocks may be combined with other blocks, and some of the blocks described are optional. The method 400 may be performed by processing logic that may comprise hardware (circuitry, dedicated logic, etc.), software, or a combination of both. In an example, the method 400 is performed by job scheduler 140.

Example method 400 may begin with receiving, by a job scheduler, a request to execute a first job (block 410). In an example, executing the first job includes executing a first executable code (e.g., application 150A). In an example, job scheduler 140 is instructed to allocate resources to execute a job based on job configuration 170 (e.g., job 171A). In such an example, job configuration 170 may be expected to execute without error, for example, based on both source code projects 180B and 184B passing their respective quality assurance testing processes. In addition, job configuration 170 itself may have been executed numerous times successfully already, and therefore job scheduler 140 may schedule the newly requested iteration of job configuration 170 to be executed without any elevated debugging settings or configurations (e.g., configurations causing debugger 142 to intercept errors generated by job 171A in real-time). In an example, job configuration 170 and job 171A are configured to execute in a cloud environment (e.g., hosted on physical hosts 110A-B), specifically on a virtual guest (e.g., guest 160) hosted in the cloud environment.

A first guest is instantiated (block 415). In an example, in response to receiving the request to execute job 171A, job scheduler 140 retrieves job configuration 170, or metadata associated with job configuration 170, to determine a proper execution environment for job 171A. For example, job configuration 170 may include computing resource requirements for a guest executing job 171A (e.g., guest 160). In the example, job scheduler 140 identifies an image file for guest 160. For example, job configuration 170 may include a reference and/or identifier of an image file corresponding to an image file used to launch guest 160. In another example, job scheduler 140 identifies dependencies of source code projects 180B and 184B (e.g., compiler 260) and selects an appropriate image file. In the example, job scheduler 140 determines that VM 122 has sufficient available compute resources (e.g., CPU cores, memory, storage, etc.) to host guest 160. In the example, job scheduler 140 instructs VM 122 to instantiate guest 160. In an example, guest 160 executes in a continuous integration, continuous development, or continuous deployment environment, where guests (e.g., guests 160, 162, 164, and 166) are instantiated to test and/or execute code and job configurations as they are produced. In an example, job 171A is expected to execute successfully because source code projects 180B and 184B have both been successfully unit tested and the only change in generating job configuration 170 from a previously released job configuration was minor incremental changes to source code project 180B. In an example, job configuration 170 may already have an established record of successful executions.

A first project stored in a source code repository is compiled into the first executable code (block 420). In an example, because job configuration 170 only represents a minor incremental change to a previously tested, certified, and released job configuration, job scheduler 140 is not initially configured to execute job 171A in a heightened debugging mode. In the example, instead of preemptively forking source code project 180B in anticipation of possibly needing to insert debugging code (e.g., a breakpoint, additional logging, etc.) source code project 180B may be a virtual reference or link to source code project 180A to save storage space. In the example, source code project 180A/B is retrieved and compiled into application 150A to be executed on guest 160.

The first guest is instructed to execute the first job including the first executable code (425). In an example, guest 160 is instructed to execute job 171A including application 150A. In an example, job 171A additionally requires execution of a copy of application 154A compiled from source code project 184B. In an example, source code projects 180B and 184B may be written in different computer programming languages. In an example, a source code project (e.g., source code project 186A/B) may be written in an interpreted language that does not require compilation (e.g., a scripting language). In some examples, a program written in a scripting language may nevertheless be compiled into machine code, for example, for faster execution. In an example, job 171A is configured so that progress and execution logs, including error logs of executable code executed while executing job 171A is stored in a location accessible to and monitored by debugger 142. For example, a centralized log storage volume on physical host 110A or a centralized storage node may be configured to be periodically scanned for errors by debugger 142.

A debugger in the job scheduler determines that the first job failed to execute based on an error executing the first executable code (block 430). In an example, debugger 142 determines, directly (e.g., via a forwarded error from guest 160), or indirectly (e.g., via scanning error logs of guest 160), that job 171A failed to successfully execute based on application 150A experiencing an error. In an example, error logs may be stored to a network attached storage node that persists even after guest 160 is terminated. In an example, debugger 142 may be configured to scan the log storage node for errors of applications and jobs configured to store logs in the log storage node periodically in case a job has a failure. In an example, such a configuration may be implemented in a production environment implementing jobs that have been executed successfully repeatedly to catch errors triggered by unaccounted for edge case execution states. In an example, debugger 142 may be configured to react to any detected errors from any executing jobs scheduled by job scheduler 142. For example, in response to detecting that job 171A failed to fully execute, debugger 142 prevents guest 160 from being terminated. In the example, guest 160 is then reconfigured to be suspended instead of terminated after being idle for a set timeout period.

The debugger determines a first programming language of the first project (block 435). In an example, debugger 142 then determines what programming language source code project 180B is written in. For example, debugger 142 determines that application 150A that experienced an unhandled error is compiled from source code project 180B. In the example, debugger 142 then retrieves source code project 180B and/or metadata associated with source code project 180B to determine the programming language of source code project 180B.

The debugger updates the first project by inserting a breakpoint in the first programming language based on the error (block 440). In an example, debugger 142 inserts a breakpoint prior to a line of code in source code project 180B identified as the failure point in error 230. In the example, the breakpoint is inserted with the proper syntax for the programming language of source code project 180B. In an example, debugger 142 actually detects multiple errors, for example, in both application 150A and in a copy of application 154A that executed on guest 160. In the example, debugger 142 determines that application 154A is written in a different programming language from application 150A, and therefore inserts a differently constructed breakpoint in the proper syntax for source code project 184B's programming language into source code project 184B.

The debugger saves the updated first project as a second project in the source code repository (block 445). In an example, debugger 142 is set to a reactive mode where job 171A was expected to succeed executing. In the example, job configuration 170 does not store source code project 180B as a separate file from source code project 180A. Instead source code project 180B is a virtual link or reference, or a copy-on-write copy of source code project 180A. In the example, upon debugger 142 inserting the breakpoint into source code project 180B, source code project 180B is saved in source code repository 145 as a distinct and separate file from source code project 180A (e.g., rather than overwriting source code project 180A). In an example, job configuration 170 may be updated, or a new job configuration may be created with the updated copy of source code project 180B that includes the breakpoint. In an example, source code project 280A is source code project 180B with the additional breakpoint. In the example, upon committing the changes to source code project 280A, job configuration 170 is overwritten by job configuration 270A with source code project 180B replaced with source code project 280A.

A second guest is instructed to execute a second job (block 450). In an example, the second job is a copy of the first job with the first executable code replaced by a second executable code compiled from the second project. In an example, after inserting debugging configurations including the breakpoint, debugger 142 instructs job scheduler 140 to execute the updated job configuration 270A. In an example, job scheduler 140 instantiates a new guest to execute job configuration 270A, for example, where guest 160 is terminated prior to debugger 142 being able to preserve guest 160. In another example, guest 160 may be configured to execute job 271A based on job configuration 270A. In an example, guest 160 may have been suspended and/or hibernated after job 171A failed, and may thereafter have been awakened to execute job 271A. In an example, the awakened guest 160 may have saved the execution states of various tasks of job 271A from when they were performed as part of executing job 171A, and these saved execution states may be reused to more efficiently bring the execution state of guest 160 back to the failure point during the execution of job 171A (e.g., the point where the breakpoint was inserted by debugger 142).

Execution of the second job is paused at the breakpoint in the second executable code (block 455). In an example, execution of application 250A is paused at the breakpoint inserted by debugger 142. In an example, executing job 271A up until the breakpoint takes less time than executing job 171A, for example, based on reusable results of repeated successfully executed tasks when executing job 171A. For example, the environment to begin executing application 250A (e.g., guest 160, input data retrieval, etc.) may all be reused from the execution of job 171A because debugger 142 stopped guest 160 from being terminated and its resources reclaimed. In an example, other applications execute prior to application 150A or 250A in the execution of jobs 171A and 271A, and the results of those applications' processing may also be reused, potentially saving hours of processor cycles, and the corresponding power consumption and heat generation resulting from such processor execution. In an example, to conserve computing resources, if an engineer is not immediately available to address an error that is not addressable by automated remediation, guest 160 may be suspended and/or hibernated with execution of application 250A paused. In the example, guest 160 may be quickly resumed when requested by an engineer allowing the engineer to immediately troubleshoot error 230 rather than discovering a failed job 171A and restarting job 271A from instantiating a new guest (e.g., if guest 160 was terminated). In an example, re-execution triggered by debugger 142 may also be performed as a low priority task. For example, there are typically low usage periods for shared computing hardware during a given day (e.g., 1 AM-5 AM). Debugger 142 and/or job scheduler 140 may be configured to defer automated re-execution of failed jobs to such low usage periods thereby increasing computing resource utilization by utilizing otherwise unutilized processing power, which allows for more processing on the same hardware.

Figure 5A:
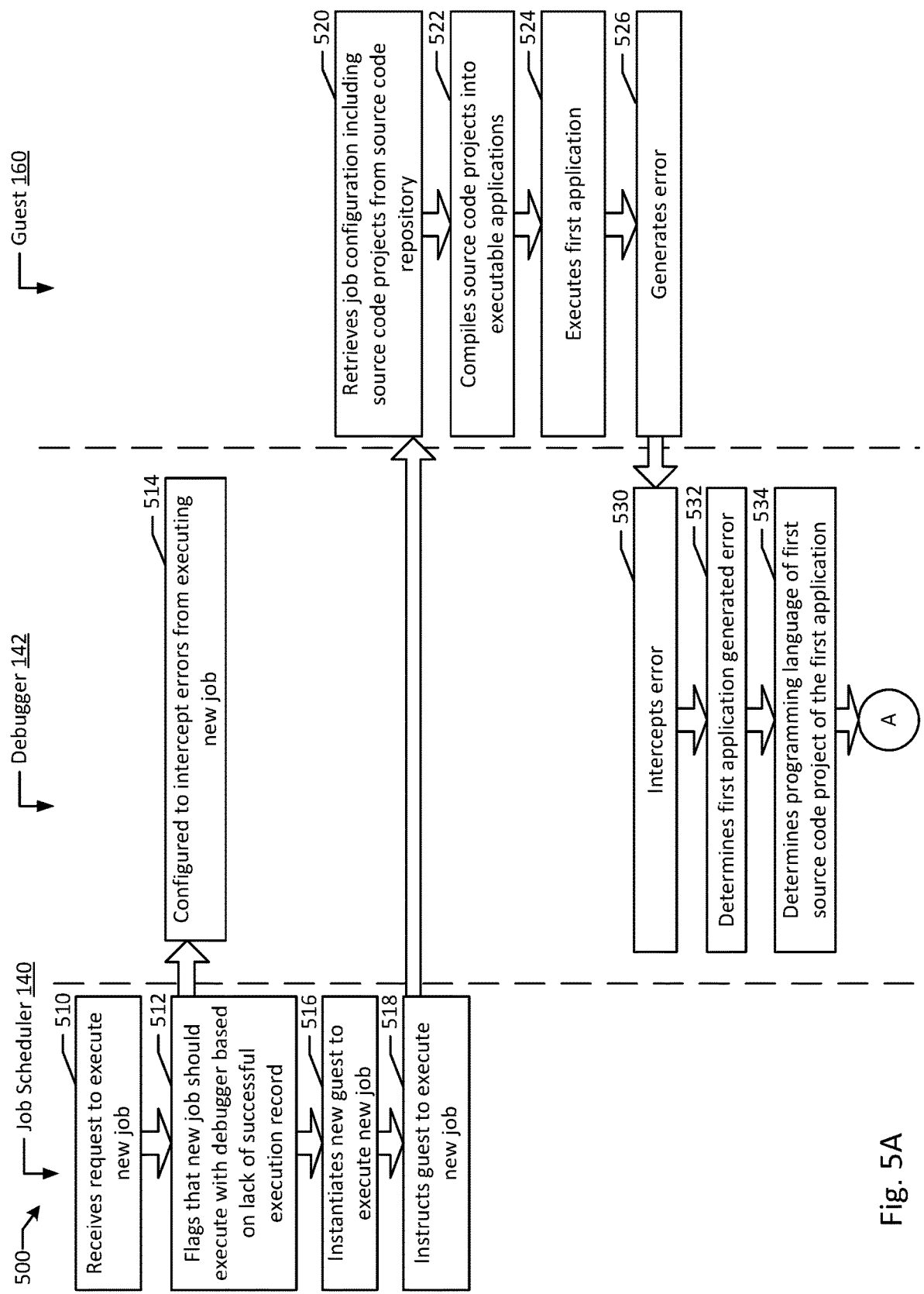
FIGS. 5A-B are flow diagrams of an example of a debugging system debugging a scheduled job according to an example of the present disclosure.
Figure 5B:
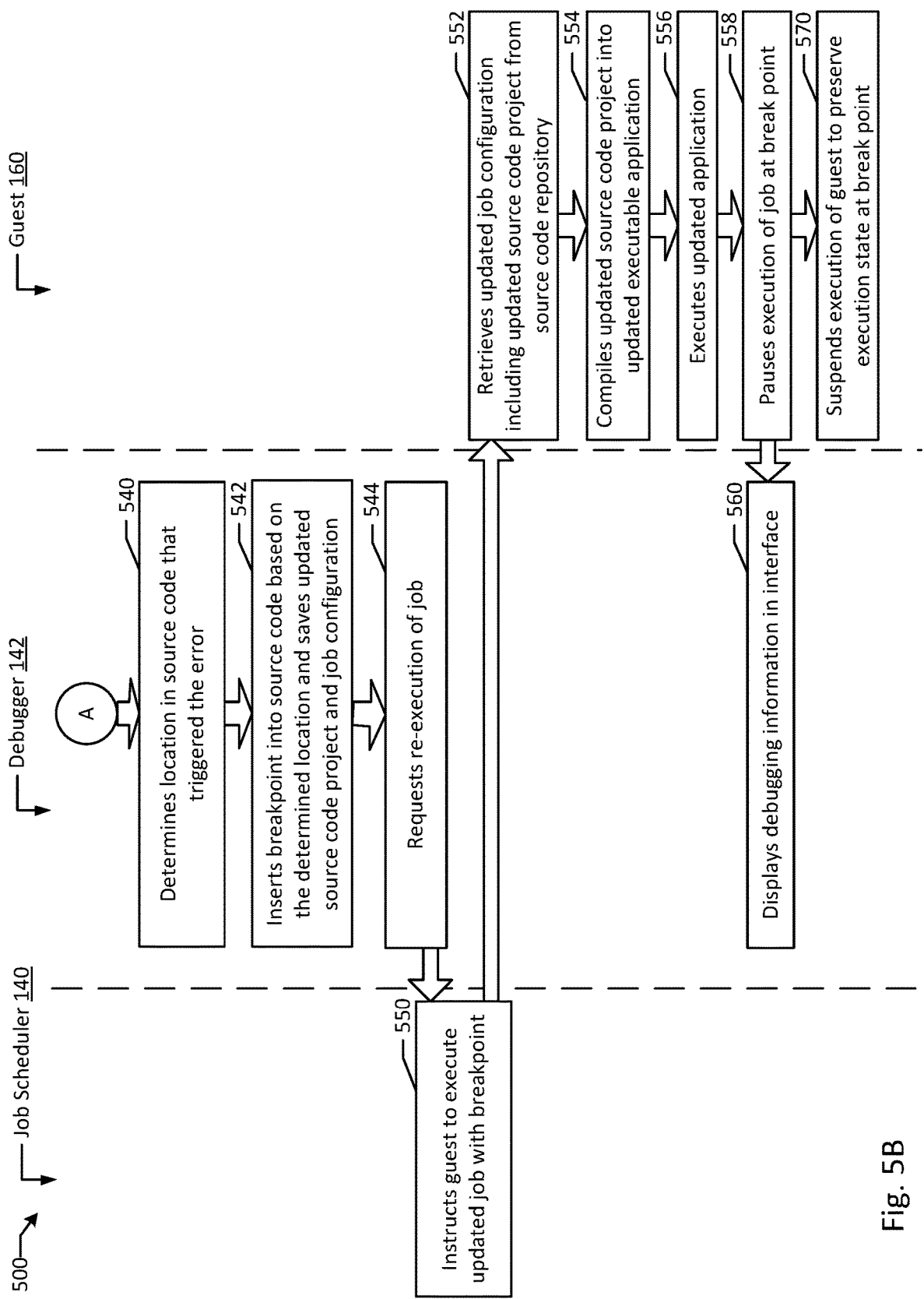

FIGS. 5A-B are flow diagrams of an example of a debugging system debugging a scheduled job according to an example of the present disclosure. Although the examples below are described with reference to the flow diagram illustrated in FIGS. 5A-B, it will be appreciated that many other methods of performing the acts associated with FIGS. 5A-B may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 500, job scheduler 140 schedules a job to execute on guest 160, and debugger 142 catches an error in the job's execution, and then automatically adds a breakpoint in the job and re-executes the job with the breakpoint based on the error.

In example system 500 illustrated in FIG. 5A, job scheduler 140 receives a request to execute a new job 171A (block 510). In the example, job scheduler 140 flags that the new job has not been successfully executed before, and should therefore be executed with debugger 142 actively monitoring and intercepting any error messages based on the lack of a successful execution record for jobs based on job configuration 170 (block 512). In the example, debugger 142 is configured to intercept errors from executing the new job (e.g., errors generated are configured to be sent to debugger 142) (block 514). In an example, errors are configured to be sent to debugger 142 instead of to an error log on the guest executing job 171A, for example, by redirecting stderr. In an example, job scheduler 140 instantiates a new guest 160 to execute the new job (block 516). In an example, after instantiating guest 160, job scheduler 140 instructs guest 160 to execute job 171A based on job configuration 170 (block 518).

In an example, guest 160 retrieves job configuration 170 including source code projects 180B and 184B from source code repository 145 (block 520). In the example, guest 160 (e.g., compiler 260) compiles the source code projects 180B and 184B into executable applications 150A and a copy of application 154A (block 522). In an example, guest 160 begins executing application 150A on input data received and/or retrieved from over a network (block 524). In the example, application 150A generates error 230 which is redirected to debugger 142 (block 526). In an example, debugger 142 intercepts error 230 (block 530). Debugger 142 then determines that application 150A generated error 230 (e.g., by parsing error 230) (block 532). In an example, debugger 142 then determines the programming language of source code project 180B from which application 150A was compiled (block 534). In an example, the error message of error 230 indicates the programming language of source code project 180B (e.g., based on a header of the message or the syntax of the error message).

In example system 500 further illustrated in FIG. 5B which is a continuation of system 500, debugger 142 then determines a location in source code project 180B that triggered error 230 (block 540). In an example, error 230 includes a line number of the line of source code that generated the error 230. In an example, debugger 142 inserts a breakpoint into the source code project 180B based on the determined location that generated the error 230, and saves the updated source code project 180B as a new source code project 280A in a new job configuration 270A in source code repository 145 (block 542). In an example, debugger 142 then requests job scheduler 140 to re-execute the updated job (e.g., a job based on job configuration 270A) (block 544). In response, job scheduler 140 instructs guest 160 to execute updated job 271A with the inserted breakpoint (block 550). In an example, guest 160 is configured to wait for updated job execution instructions after a failure, since debugger 142 can automatically generate updated job configuration 270A very shortly (e.g., within second, minutes) of intercepting error 230.

In an example, guest 160 retrieves updated job configuration 270A including updated source code project 280A from source code repository 145 after job scheduler 140 instructs guest 160 to re-execute the failed job (block 552). In an example updated job configuration 270A overwrites original job configuration 170, and therefore from guest 160's perspective, it is re-retrieving the same job configuration as it previously attempted to execute. In an example, guest 160 compiles the updated source code project 280A into updated executable application 250A (block 554). Guest 160 then executes the updated application 250A (block 556). Execution of application 250A is paused at the inserted breakpoint (block 558). In an example, debugging information related to application 250A is sent back to debugger 142 to allow the debugging information to be presented via a debugger interface (block 560). In an example, the debugger interface is a graphical user interface. In an example, the debugger interface is a command line interface or an application programming interface. In an example, guest 160 suspends itself to preserve the execution state of application 250A at the breakpoint for an engineer to investigate (block 570).

Figure 6A:
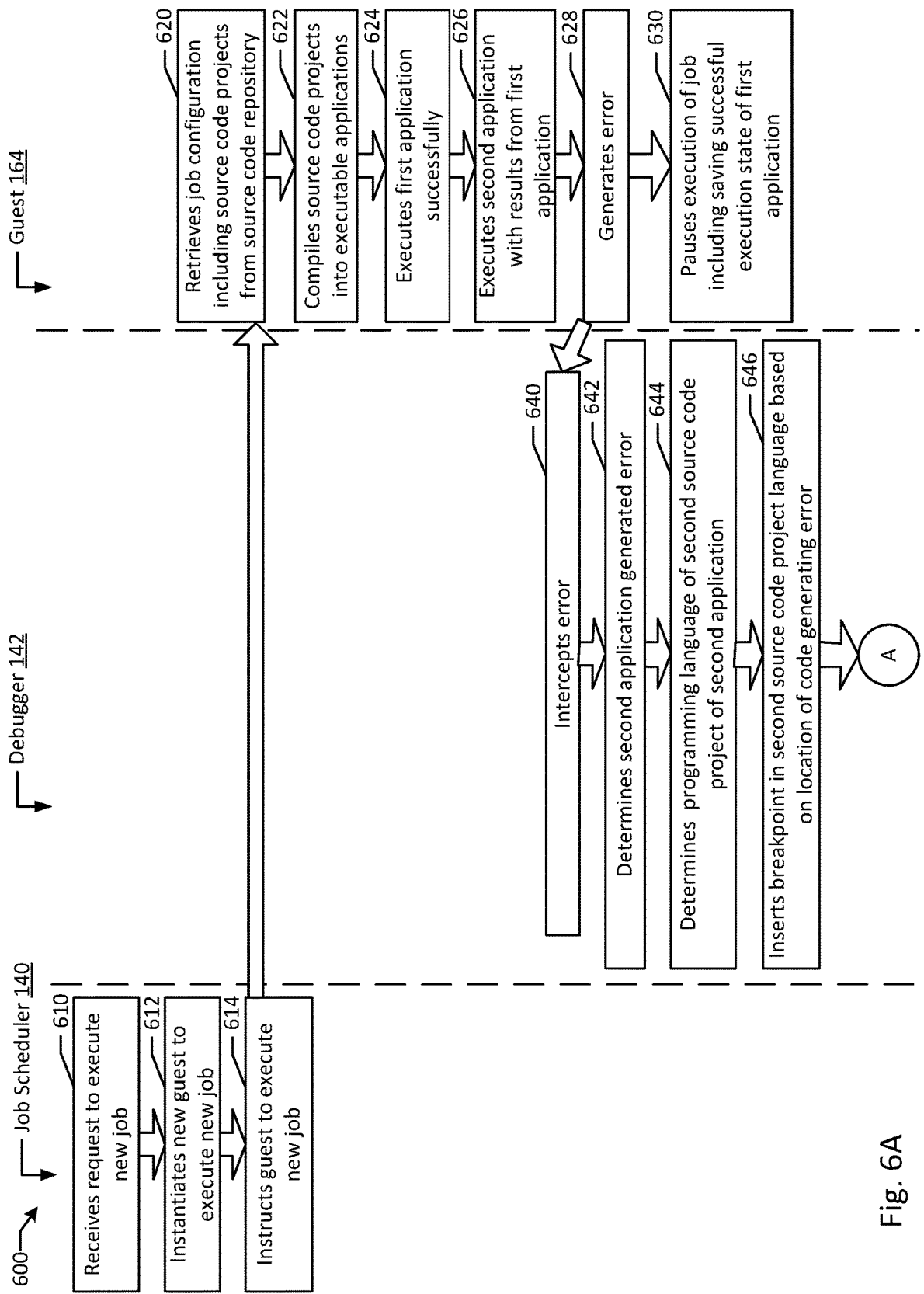
FIG. 6A-B are flow diagrams of an example of a debugging system debugging a scheduled job according to an example of the present disclosure.
Figure 6B:
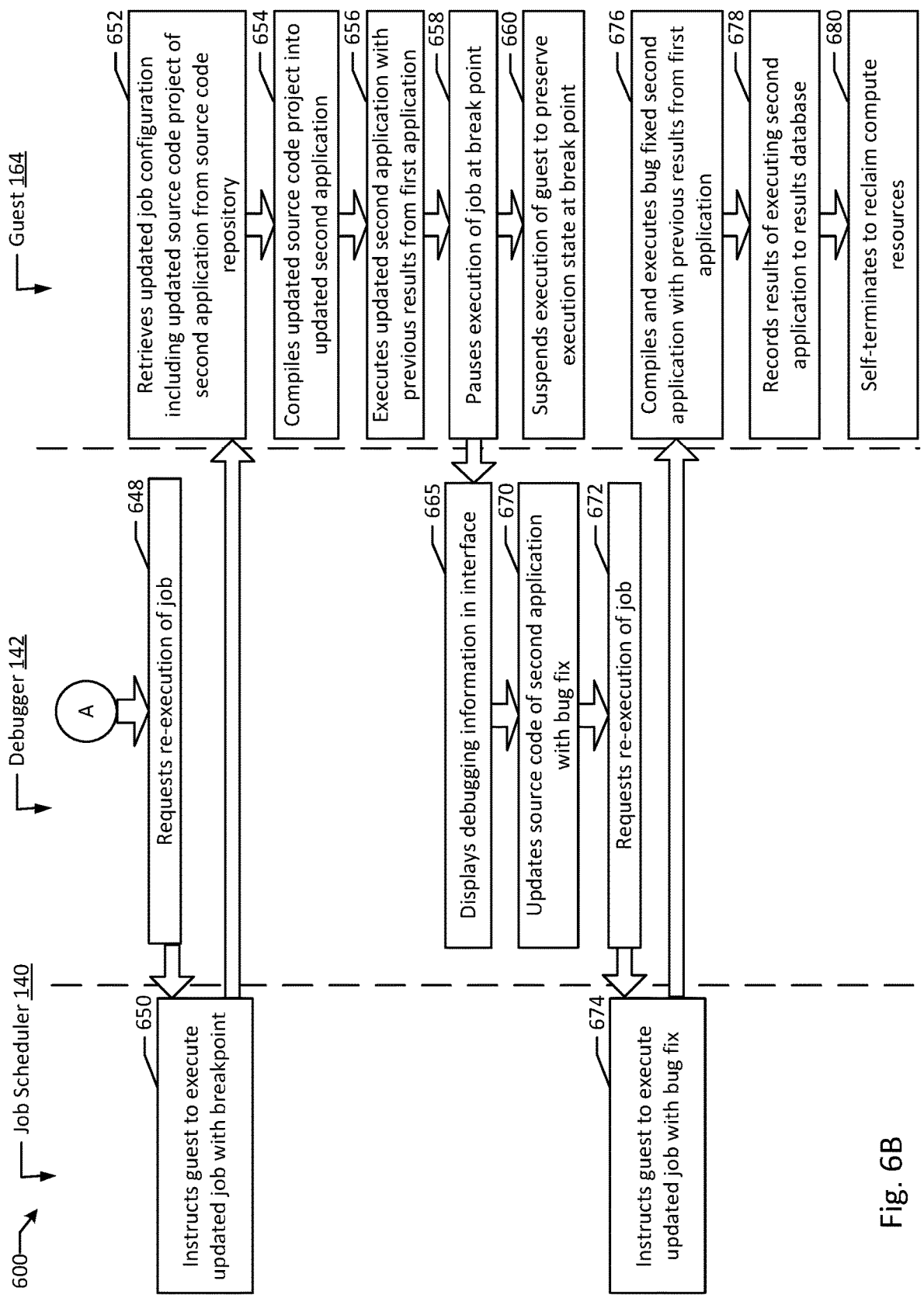

FIG. 6A-B are flow diagrams of an example of a debugging system debugging a scheduled job according to an example of the present disclosure. Although the examples below are described with reference to the flow diagram illustrated in FIGS. 6A-B, it will be appreciated that many other methods of performing the acts associated with FIGS. 6A-B may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 600 job scheduler 140 schedules a job to execute on guest 160, and debugger 142 detects an error in the job execution, inserts a breakpoint in the job to aid in debugging the job, and updates the job with a bug fix resulting in a successful re-execution of the job.

In example system 600 illustrated in FIG. 6A, job scheduler 140 receives a request to execute a new job based on new job configuration 175 (block 610). In the example, job scheduler 140 instantiates guest 164 to execute new job 176A based on job configuration 175 (block 612). Newly instantiated guest 164 is instructed to execute job 176A (block 614). In an example, debugger 142 is configured to intercept errors on guest 164, for example, by receiving the error output (e.g., stderr) from guest 164. In the example, guest 164 retrieves job configuration 175 from source code repository 145, including source code projects 180C, 182B, and 186B (block 620). Guest 164 then compiles source code projects 180C, 182B, and 186B into executable applications (e.g., application 150B) (block 622). In an example, one or more external compilers compile source code projects 180C, 182B, and 186B into executable applications. In an example, guest 164 begins executing job 176A, including successfully executing application 150B (block 624). Guest 164 then executes an application compiled from source code project 182B with the results from application 150B (block 626). In an example, this second application generates an error (block 628). Guest 164, based on the execution of the second application failing, pauses execution of job 176A, which includes saving the successful execution state of application 150B, including the results input into the second application, to persistent storage (block 630).

In an example, debugger 142 intercepts the error generated by the second application (block 640). Debugger 142 then determines that the second application generated the error (block 642). Debugger 142 then retrieves source code project 182B (e.g., with source code analyzer 245) to determine the programming language used to code source code project 182B (block 644). Debugger 142 also parses the error from the second application to determine a location in source code project 182B responsible for generating the error. In an example, debugger 142 inserts a breakpoint in the identified programming language's syntax at a location based on the location in the source code project 182B identified based on the error (block 646).

In example system 600 further illustrated in FIG. 6B which is a continuation of system 600, debugger 142 then requests re-execution of failed job 176A, which has been updated with the breakpoint in source code project 182B (block 648). In the example, job scheduler 140 instructs guest 164 to execute the updated job with the inserted breakpoint (block 650). In an example, job scheduler 140 and/or guest 164 is configured to determine which tasks associated with executing job 176A need to be re-executed and which previous results may be reimported in order to allow guest 164 to return to the execution state resulting in the error faster. Guest 164 retrieves the updated version of job 176A, including the updates source code project 182B with the breakpoint from source code repository 145 (block 652). In an example, guest 164 compiles the updated source code project into an updated version of the second application (block 654). In the example, guest 164 executes the updated second application using the stored results from executing the first application 150B successfully earlier (block 656). In the example, guest 164 pauses execution of the updated job at the breakpoint in the updated second application (block 658). Guest 164 then suspends its own execution to preserve the execution state of guest 164 at the breakpoint (block 660).

In an example, debugger 142 receives and presents debugging information via an interface based on the execution of the second application with additional debugging configurations (block 665). In an example, debugger 142 updates the source code project 182B of the second application with a bug fix (block 670). In some examples, the bug fix may be an automated bug fix inserted based on debugger 142 parsing the debugging information with configured rulesets. For example, certain syntactical fixes in programming code and/or straight forward errors such as timeouts may be remedied automatically. In another example, an engineer inserts a bug fix via debugger 142's interface based on reviewing the debugging information and/or the paused execution state of guest 164. In an example, debugger 142 requests re-execution of the job 176A with the bug fix included in the updates source code project 182B (block 672). In an example, job scheduler 140 instructs guest 164 to execute the updated job with the bug fix (block 674). In response, guest 164 retrieves the update source code project 182B with the bug fix, compiles the bug fixed version of the second application, and executes the bug fixed second application with the previously stored results of executing the application 150B (block 676). In the example, guest 164 records results from successfully executing application 182B in a result database (block 678). In an example, job 176A additionally includes executing a copy of application 156A compiled from source code project 186B. In an example, guest 164 self-terminates after completing execution of job 176A successfully to allow system 100 to reclaim the computing resources allocated to guest 164 (block 680).

Figure 7:
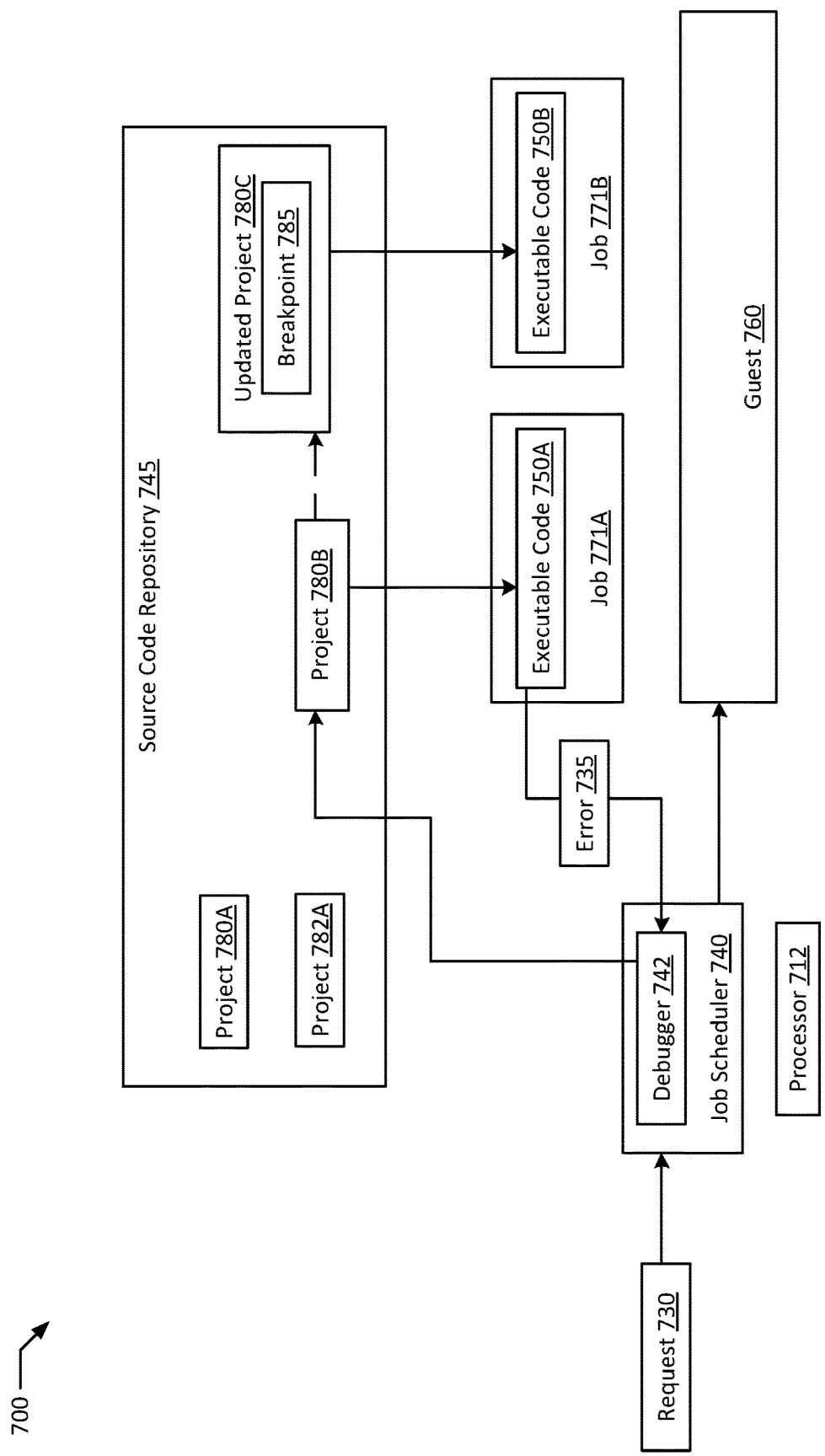
FIG. 7 is a block diagram of a debugging system according to an example of the present disclosure.

FIG. 7 is a block diagram of a debugging system according to an example of the present disclosure. Example system 700 includes a source code repository 745 storing projects 780A and 780B. Processor 712 is configured to execute job scheduler 740 which includes debugger 742. Job scheduler 740 receives request 730 to execute job 771A, where executing job 771A includes executing executable code 750A. Guest 760 is instantiated. Project 780A is copied to source code repository 745 as project 780B. Project 780B is compiled into executable code 750A. Guest 760 is instructed to execute job 771A including executable code 750A. Debugger 742 intercepts error 735 caused by executing executable code 750A. Debugger 742 updates project 780B by inserting breakpoint 785 into project 780B based on error 735 resulting in updated project 780C. Updated project 780C is compiled into executable code 750B. Guest 760 is instructed to re-execute job 771A (e.g., as job 771B) including executing executable code 750B. Execution of executable code 750B is paused at breakpoint 785.

Figure 8:
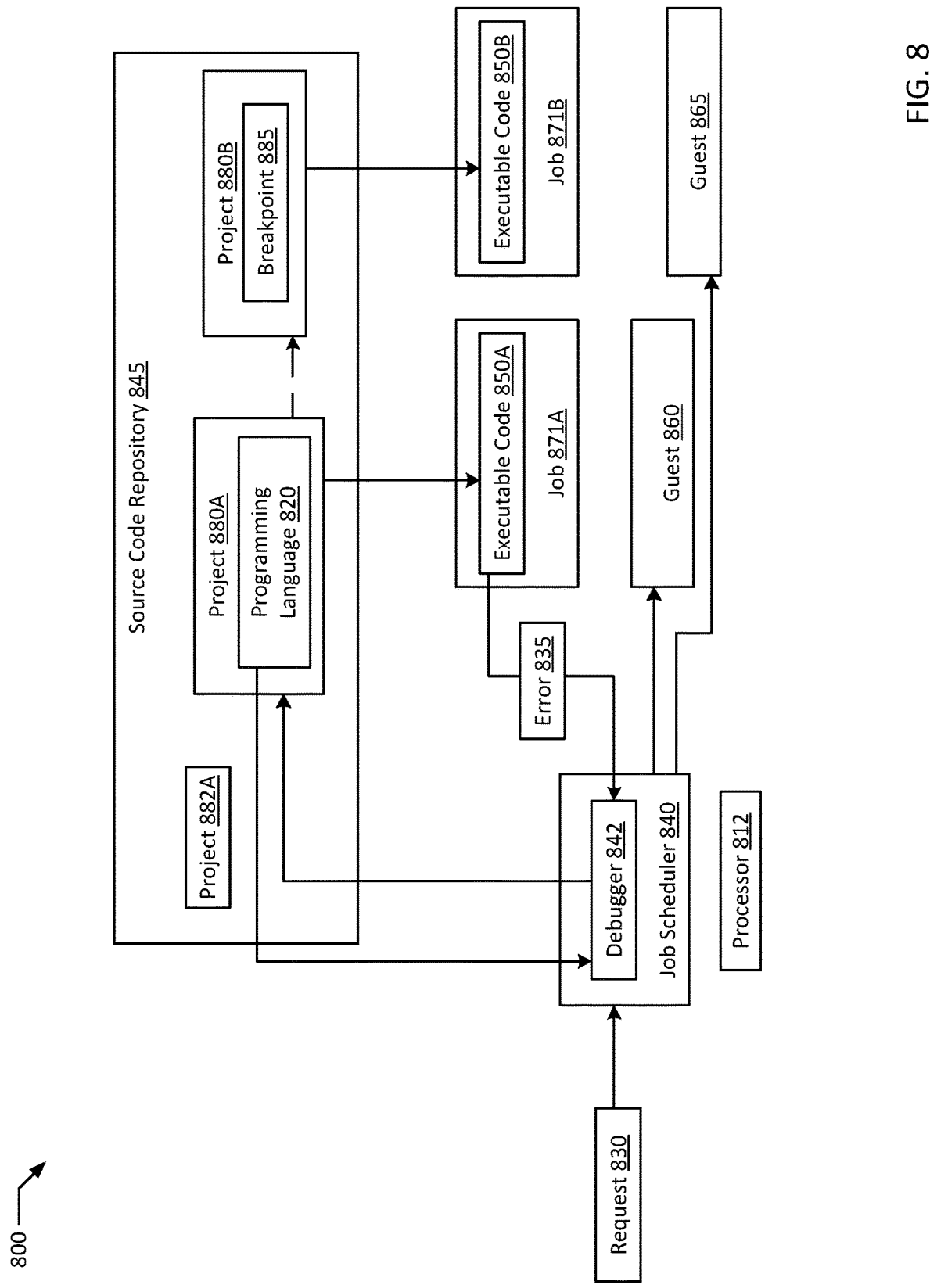
FIG. 8 is a block diagram of a debugging system according to an example of the present disclosure.

FIG. 8 is a block diagram of a debugging system according to an example of the present disclosure. Example system 800 includes a source code repository 845 storing projects 880A and 880B. Processor 812 is configured to execute job scheduler 840 which includes debugger 842. Job scheduler 840 receives request 830 to execute job 871A, where executing job 871A includes executing executable code 850A. Guest 860 is instantiated. Project 880A is compiled into executable code 850A. Guest 860 is instructed to execute job 871A including executable code 850A. Debugger 842 determines that job 871 failed to execute based on error 835 executing executable code 850A. Debugger 842 determines programming language 820 of project 880A. Debugger 842 updates project 880B by inserting breakpoint 885 in programming language 820 into project 880B based on error 835 resulting in updated project 880C. Debugger 842 saves the updated project 880A as project 880B in source code repository 843. Guest 865 is instructed to execute job 871B, where job 871B is a copy of job 871A with executable code 850A replaced with executable code 850B compiled from project 880B. Execution of job 871B is paused at breakpoint 885 in executable code 850B.

Continuous debugging systems as disclosed herein provide significant computing efficiency advantages to shared computing environments (e.g., cloud computing environments) by automating debugging procedures, and in some cases, software bug remediation. These efficiencies are especially significant in the example CICD environments discussed above, and with large programs or combinations of programs (e.g., services and jobs) that take a long time to execute. For example, an engineer may spend time constructing a new job that is expected to take six to eight hours to complete execution, and may start the execution of the job as the engineer leaves the office for the night expecting to see results in the morning. The job successfully executes through many steps and fails on a final task in hour seven of execution. An automated debugger built into a job scheduler for executing the job may intercept the error resulting from the failed processing task and insert a breakpoint in the source code of the application generating the error within seconds. This application may be recompiled and executed with cached intermediary results, which re-execution may be performed during periods of low computing resource usage for increased compute utilization, while also aiding in evening out intra-day power consumption. The re-execution may also be scheduled on the same physical or virtual system where the failure just occurred, and may additionally reuse cached results of earlier successful computing tasks in the failed job. This automated re-execution is optimally performed during off-peak hours instead of adding to peak time compute demand which results in demand for additional hardware to handle peak usage computing loads. In addition, rather than wasting storage space storing intermediary results for every job executing in an environment, debugging and execution state storage may be configured automatically based on the historic execution successfulness of a given job. Human error is therefore reduced (e.g., from failing to turn on debugging for a new job). Preserving guests from being reclaimed is also a dynamic process in response to an error being detected. Dynamic guest preservation allows guests to be configured to be reclaimed by default, thereby increasing hardware utilization by quickly reclaiming guests that finish their processing tasks, without potentially losing valuable troubleshooting data during a failure. Less testing may also be required prior to releasing code since the cost of code failure may be much reduced, resulting in faster software updates. Faster software updates may be advantageous for adding new features to code, as well as for implementing security updates in response to new security threats. By implementing continuous debugging, hardware utilization may be increased while also increasing software release frequency, resulting in significantly more efficient usage of computing environments, especially CICD environments.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

Aspects of the subject matter described herein may be useful alone or in combination with one or more other aspects described herein. In a 1st exemplary aspect of the present disclosure, a system comprises: a source code repository storing a plurality of source code projects, including a first project; a processor configured to execute a job scheduler, which includes a debugger, to: receive a first request to execute a first job, wherein executing the first job includes executing a first executable code; instantiate a first guest; copy the first project to the source code repository as a second project; compile the second project into the first executable code; instruct the first guest to execute the first job including the first executable code; intercept, by the debugger, a first error caused by executing the first executable code; update, by the debugger, the second project by inserting a first breakpoint into the second project based on the first error; compile the updated second project into a second executable code; instruct the first guest to re-execute the first job including executing the second executable code; and pause execution of the second executable code at the first breakpoint.

In accordance with a 2nd exemplary aspect of the present disclosure, which may be used in combination with any one or more of other aspects described herein (e.g., the 1st aspect), wherein the debugger is configured to: determine a first programming language of the second project, wherein the first breakpoint is inserted in the first programming language. In accordance with a 3rd exemplary aspect of the present disclosure, which may be used in combination with any one or more of other aspects described herein (e.g., the 1st aspect), wherein the job scheduler executes in at least one of a continuous integration and a continuous development environment. In accordance with a 4th exemplary aspect of the present disclosure, which may be used in combination with any one or more of other aspects described herein (e.g., the 1st aspect), wherein executing the first job includes executing a third executable code compiled from a third project of the plurality of source code projects, and the third project is written in a different programming language from the first project. In accordance with a 5th exemplary aspect of the present disclosure, which may be used in combination with any one or more of other aspects described herein (e.g., the 4th aspect), wherein executing the third executable code triggers a second error, and the debugger inserts a second breakpoint into one of the third project and a fourth project that is a copy of the third project prior to re-executing the first job.

In accordance with a 6th exemplary aspect of the present disclosure, which may be used in combination with any one or more of other aspects described herein (e.g., the 1st aspect), wherein the job scheduler is further configured to: receive a second request to execute a second job different from the first job, wherein executing the second job includes executing the first executable code; instantiate a second guest; compile the first project into the first executable code; instruct the second guest to execute the second job including the first executable code; and upon completion of the second job, reclaim compute resources associated with the second guest by terminating the second guest.

In accordance with a 7th exemplary aspect of the present disclosure, which may be used in combination with any one or more of other aspects described herein (e.g., the 1st aspect), wherein the first guest is prevented from being terminated based on the debugger intercepting the first error. In accordance with an 8th exemplary aspect of the present disclosure, which may be used in combination with any one or more of other aspects described herein (e.g., the 1st aspect), wherein the first job includes a plurality of tasks including a first task and a second task, and the first guest imports a result of executing the first task when re-executing the first job rather than re-executing the first task. In accordance with a 9th exemplary aspect of the present disclosure, which may be used in combination with any one or more of other aspects described herein (e.g., the 1st aspect), wherein the updated second project overwrites the second project in the source code repository. In accordance with a 10th exemplary aspect of the present disclosure, which may be used in combination with any one or more of other aspects described herein (e.g., the 1st aspect), wherein the first guest is suspended after pausing execution of the second executable code.

Aspects of the subject matter described herein may be useful alone or in combination with one or more other aspects described herein. In a 11th exemplary aspect of the present disclosure, a system comprises a means for a means for receiving, by a job scheduler, a first request to execute a first job, wherein executing the first job includes executing a first executable code; a means for instantiating a first guest; a means for copying a first project stored in a source code repository as a second project in the source code repository; a means for compiling the second project into the first executable code; a means for instructing the first guest to execute the first job including the first executable code; a means for intercepting, by a debugger in the job scheduler, a first error caused by executing the first executable code; a means for updating, by the debugger, the second project by inserting a first breakpoint into the second project based on the first error; a means for compiling the updated second project into a second executable code; a means for instructing the first guest to re-execute the first job including executing the second executable code; and a means for pausing execution of the second executable code at the first breakpoint.

Aspects of the subject matter described herein may be useful alone or in combination with one or more other aspects described herein. In a 12th exemplary aspect of the present disclosure, a computer-readable non-transitory storage medium storing executable instructions, which when executed by a computer system, cause the computer system to: receive, by a job scheduler, a first request to execute a first job, wherein executing the first job includes executing a first executable code; instantiate a first guest; copy a first project stored in a source code repository as a second project in the source code repository; compile the second project into the first executable code; instruct the first guest to execute the first job including the first executable code; intercept, by a debugger in the job scheduler, a first error caused by executing the first executable code; update, by the debugger, the second project by inserting a first breakpoint into the second project based on the first error; compile the updated second project into a second executable code; instruct the first guest to re-execute the first job including executing the second executable code; and pause execution of the second executable code at the first breakpoint.

Aspects of the subject matter described herein may be useful alone or in combination with one or more other aspects described herein. In a 13th exemplary aspect of the present disclosure, a method comprises receiving, by a job scheduler, a first request to execute a first job, wherein executing the first job includes executing a first executable code; instantiating a first guest; copying a first project stored in a source code repository as a second project in the source code repository; compiling the second project into the first executable code; instructing the first guest to execute the first job including the first executable code; intercepting, by a debugger in the job scheduler, a first error caused by executing the first executable code; updating, by the debugger, the second project by inserting a first breakpoint into the second project based on the first error; compiling the updated second project into a second executable code; instructing the first guest to re-execute the first job including executing the second executable code; and pausing execution of the second executable code at the first breakpoint.

In accordance with a 14th exemplary aspect of the present disclosure, which may be used in combination with any one or more of other aspects described herein (e.g., the 11th, 12th, or 13th aspects), further comprising: determining, by the debugger, a first programming language of the second project; and inserting the first breakpoint in the first programming language. In accordance with a 15th exemplary aspect of the present disclosure, which may be used in combination with any one or more of other aspects described herein (e.g., the 11th, 12th, or 13th aspects), further comprising: executing the job scheduler in at least one of a continuous integration and a continuous development environment. In accordance with a 16th exemplary aspect of the present disclosure, which may be used in combination with any one or more of other aspects described herein (e.g., the 11th, 12th, or 13th aspects), wherein executing the first job includes executing a third executable code compiled from a third project of the plurality of source code projects, and the third project is written in a different programming language from the first project. In accordance with a 17th exemplary aspect of the present disclosure, which may be used in combination with any one or more of other aspects described herein (e.g., the 16th aspect), wherein executing the third executable code triggers a second error, the method further comprising: inserting, by the debugger, a second breakpoint into one of the third project and a fourth project that is a copy of the third project; and re-executing the first job after inserting the second breakpoint.

In accordance with an 18th exemplary aspect of the present disclosure, which may be used in combination with any one or more of other aspects described herein (e.g., the 11th, 12th, or 13th aspects), further comprising: receiving a second request to execute a second job different from the first job, wherein executing the second job includes executing the first executable code; instantiating a second guest; compiling the first project into the first executable code; instructing the second guest to execute the second job including the first executable code; and upon completion of the second job, reclaiming compute resources associated with the second guest by terminating the second guest. In accordance with a 19th exemplary aspect of the present disclosure, which may be used in combination with any one or more of other aspects described herein (e.g., the 11th, 12th, or 13th aspects), further comprising: preventing the first guest from being terminated based on the debugger intercepting the first error. In accordance with a 20th exemplary aspect of the present disclosure, which may be used in combination with any one or more of other aspects described herein (e.g., the 11th, 12th, or 13th aspects), wherein the first job includes a plurality of tasks including a first task and a second task, the method further comprising: importing a result of executing the first task; and re-executing the first job with the result instead of re-executing the first task. In accordance with a 21st exemplary aspect of the present disclosure, which may be used in combination with any one or more of other aspects described herein (e.g., the 11th, 12th, or 13th aspects), further comprising: overwriting the second project with the updated second project in the source code repository. In accordance with a 22nd exemplary aspect of the present disclosure, which may be used in combination with any one or more of other aspects described herein (e.g., the 11th, 12th, or 13th aspects), further comprising: suspending the first guest after pausing execution of the second executable code.

Aspects of the subject matter described herein may be useful alone or in combination with one or more other aspects described herein. In a 23rd exemplary aspect of the present disclosure, a system comprises a source code repository storing a plurality of source code projects, including a first project; a processor configured to execute a job scheduler, which includes a debugger, to: receive a first request to execute a first job, wherein executing the first job includes executing a first executable code; instantiate a first guest; compile the first project into the first executable code; instruct the first guest to execute the first job including the first executable code; determine, by the debugger, that the first job failed to execute based on a first error executing the first executable code; determine, by the debugger, a first programming language of the first project; update, by the debugger, the first project by inserting a first breakpoint in the first programming language based on the first error; save, by the debugger, the updated first project as a second project in the source code repository; instruct a second guest to execute a second job, wherein the second job is a copy of the first job with the first executable code replaced by a second executable code compiled from the second project; and pause execution of the second job at the first breakpoint in the second executable code.

In accordance with a 24th exemplary aspect of the present disclosure, which may be used in combination with any one or more of other aspects described herein (e.g., the 23rd aspect), wherein the first guest executes in at least one of a continuous integration and a continuous development environment. In accordance with a 25th exemplary aspect of the present disclosure, which may be used in combination with any one or more of other aspects described herein (e.g., the 23rd aspect), wherein executing the first job includes executing a third executable code compiled from a third project of the plurality of source code projects, and the third project is written in a different programming language from the first project. In accordance with a 26th exemplary aspect of the present disclosure, which may be used in combination with any one or more of other aspects described herein (e.g., the 25th aspect), wherein executing the third executable code triggers a second error, and the debugger inserts a second breakpoint into one of the third project and a fourth project that is a copy of the third project prior to re-executing the first job.

In accordance with a 27th exemplary aspect of the present disclosure, which may be used in combination with any one or more of other aspects described herein (e.g., the 23rd aspect), wherein the job scheduler is further configured to: receive a second request to execute a third job different from the first job, wherein executing the third job includes executing the first executable code; instantiate a third guest; compile the first project into the first executable code; instruct the third guest to execute the second job including the first executable code; and upon completion of the second job, reclaim compute resources associated with the third guest by terminating the third guest.

In accordance with a 28th exemplary aspect of the present disclosure, which may be used in combination with any one or more of other aspects described herein (e.g., the 23rd aspect), wherein the first guest is prevented from being terminated after failing to execute the first job, and the second guest is the first guest. In accordance with a 29th exemplary aspect of the present disclosure, which may be used in combination with any one or more of other aspects described herein (e.g., the 28th aspect), wherein the first job includes a plurality of tasks including a first task and a second task, and the first guest imports a result of executing the first task when executing the second job rather than re-executing the first task. In accordance with a 30th exemplary aspect of the present disclosure, which may be used in combination with any one or more of other aspects described herein (e.g., the 29th aspect), wherein a copy of the first project is saved as part of a first configuration of the first job, and the first configuration of the first job is overwritten by a second configuration of the second job with a copy of the second project replacing the copy of the first project. In accordance with a 31st exemplary aspect of the present disclosure, which may be used in combination with any one or more of other aspects described herein (e.g., the 23rd aspect), wherein the second guest is suspended after pausing execution of the second executable code.

Aspects of the subject matter described herein may be useful alone or in combination with one or more other aspects described herein. In a 32nd exemplary aspect of the present disclosure, a system comprises a means for a means for receiving, by a job scheduler, a first request to execute a first job, wherein executing the first job includes executing a first executable code; a means for instantiating a first guest;

a means for compiling a first project stored in a source code repository into the first executable code; a means for instructing the first guest to execute the first job including the first executable code; a means for determining, by a debugger in the job scheduler, that the first job failed to execute based on a first error executing the first executable code; a means for determining, by the debugger, a first programming language of the first project; a means for updating, by the debugger, the first project by inserting a first breakpoint in the first programming language based on the first error; a means for saving, by the debugger, the updated first project as a second project in the source code repository; a means for instructing a second guest to execute a second job, wherein the second job is a copy of the first job with the first executable code replaced by a second executable code compiled from the second project; and a means for pausing execution of the second job at the first breakpoint in the second executable code.

Aspects of the subject matter described herein may be useful alone or in combination with one or more other aspects described herein. In a 33rd exemplary aspect of the present disclosure, a computer-readable non-transitory storage medium storing executable instructions, which when executed by a computer system, cause the computer system to: receive, by a job scheduler, a first request to execute a first job, wherein executing the first job includes executing a first executable code; instantiate a first guest; compile a first project stored in a source code repository into the first executable code; instruct the first guest to execute the first job including the first executable code; determine, by a debugger in the job scheduler, that the first job failed to execute based on a first error executing the first executable code; determine, by the debugger, a first programming language of the first project; update, by the debugger, the first project by inserting a first breakpoint in the first programming language based on the first error; save, by the debugger, the updated first project as a second project in the source code repository; instruct a second guest to execute a second job, wherein the second job is a copy of the first job with the first executable code replaced by a second executable code compiled from the second project; and pause execution of the second job at the first breakpoint in the second executable code.

Aspects of the subject matter described herein may be useful alone or in combination with one or more other aspects described herein. In a 34th exemplary aspect of the present disclosure, a method comprises receiving, by a job scheduler, a first request to execute a first job, wherein executing the first job includes executing a first executable code; instantiating a first guest; compiling a first project stored in a source code repository into the first executable code; instructing the first guest to execute the first job including the first executable code; determining, by a debugger in the job scheduler, that the first job failed to execute based on a first error executing the first executable code; determining, by the debugger, a first programming language of the first project; updating, by the debugger, the first project by inserting a first breakpoint in the first programming language based on the first error; saving, by the debugger, the updated first project as a second project in the source code repository; instructing a second guest to execute a second job, wherein the second job is a copy of the first job with the first executable code replaced by a second executable code compiled from the second project; and pausing execution of the second job at the first breakpoint in the second executable code.

In accordance with a 35th exemplary aspect of the present disclosure, which may be used in combination with any one or more of other aspects described herein (e.g., the 32nd, 33rd, or 34th aspects), further comprising: executing the first guest in at least one of a continuous integration and a continuous development environment. In accordance with a 36th exemplary aspect of the present disclosure, which may be used in combination with any one or more of other aspects described herein (e.g., the 32nd, 33rd, or 34th aspects), wherein executing the first job includes executing a third executable code compiled from a third project of the plurality of source code projects, and the third project is written in a different programming language from the first project. In accordance with a 37th exemplary aspect of the present disclosure, which may be used in combination with any one or more of other aspects described herein (e.g., the 36th aspect), wherein executing the third executable code triggers a second error, and the debugger inserts a second breakpoint into one of the third project and a fourth project that is a copy of the third project prior to re-executing the first job.

In accordance with a 38th exemplary aspect of the present disclosure, which may be used in combination with any one or more of other aspects described herein (e.g., the 32nd, 33rd, or 34th aspects), further comprising: receiving a second request to execute a third job different from the first job, wherein executing the third job includes executing the first executable code; instantiating a third guest; compiling the first project into the first executable code; instructing the third guest to execute the second job including the first executable code; and upon completion of the second job, reclaiming compute resources associated with the third guest by terminating the third guest.

In accordance with a 39th exemplary aspect of the present disclosure, which may be used in combination with any one or more of other aspects described herein (e.g., the 32nd, 33rd, or 34th aspects), further comprising: preventing the first guest from being terminated after failing to execute the first job, wherein the second guest is the first guest. In accordance with a 40th exemplary aspect of the present disclosure, which may be used in combination with any one or more of other aspects described herein (e.g., the 39th aspect), wherein the first job includes a plurality of tasks including a first task and a second task, the method further comprising: importing a result of executing the first task; and re-executing the first job with the result instead of re-executing the first task.

In accordance with a 41st exemplary aspect of the present disclosure, which may be used in combination with any one or more of other aspects described herein (e.g., the 32nd, 33rd, or 34th aspects), further comprising: saving a copy of the first project as part of a first configuration of the first job; and overwriting the first configuration of the first job with a second configuration of the second job, including replacing the copy of the first project with a copy of the second project. In accordance with a 42nd exemplary aspect of the present disclosure, which may be used in combination with any one or more of other aspects described herein (e.g., the 32nd, 33rd, or 34th aspects), further comprising: suspending the second guest after pausing execution of the second executable code.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a source code repository storing a plurality of source code projects, including a first project;
a processor configured to execute a job scheduler, which includes a debugger, to:
receive a first request to execute a first job, wherein executing the first job includes executing a first executable code;
instantiate a first guest;
copy the first project to the source code repository as a second project;
compile the second project into the first executable code;
instruct the first guest to execute the first job including the first executable code;
intercept, by the debugger, a first error caused by executing the first executable code;
update, by the debugger, the second project by inserting a first breakpoint into the second project based on the first error;
compile the updated second project into a second executable code;
instruct the first guest to re-execute the first job including executing the second executable code; and
pause execution of the second executable code at the first breakpoint.

2. The system of claim 1, wherein the debugger is configured to:
determine a first programming language of the second project, wherein the first breakpoint is inserted in the first programming language.

3. The system of claim 1, wherein the job scheduler executes in at least one of a continuous integration and a continuous development environment.

4. The system of claim 1, wherein executing the first job includes executing a third executable code compiled from a third project of the plurality of source code projects, and the third project is written in a different programming language from the first project.

5. The system of claim 4, wherein executing the third executable code triggers a second error, and the debugger inserts a second breakpoint into one of the third project and a fourth project that is a copy of the third project prior to re-executing the first job.

6. The system of claim 1, wherein the job scheduler is further configured to:
receive a second request to execute a second job different from the first job, wherein executing the second job includes executing the first executable code;
instantiate a second guest;
compile the first project into the first executable code;
instruct the second guest to execute the second job including the first executable code; and
upon completion of the second job, reclaim compute resources associated with the second guest by terminating the second guest.

7. The system of claim 1, wherein the first guest is prevented from being terminated based on the debugger intercepting the first error.

8. The system of claim 1, wherein the first job includes a plurality of tasks including a first task and a second task, and the first guest imports a result of executing the first task when re-executing the first job rather than re-executing the first task.

9. The system of claim 1, wherein the updated second project overwrites the second project in the source code repository.

10. The system of claim 1, wherein the first guest is suspended after pausing execution of the second executable code.

11. A method comprising:
receiving, by a job scheduler, a first request to execute a first job, wherein executing the first job includes executing a first executable code;
instantiating a first guest;
copying a first project stored in a source code repository as a second project in the source code repository;
compiling the second project into the first executable code;
instructing the first guest to execute the first job including the first executable code;
intercepting, by a debugger in the job scheduler, a first error caused by executing the first executable code;
updating, by the debugger, the second project by inserting a first breakpoint into the second project based on the first error;
compiling the updated second project into a second executable code;
instructing the first guest to re-execute the first job including executing the second executable code; and
pausing execution of the second executable code at the first breakpoint.

12. A system comprising:
a source code repository storing a plurality of source code projects, including a first project;
a processor configured to execute a job scheduler, which includes a debugger, to:
receive a first request to execute a first job, wherein executing the first job includes executing a first executable code;
instantiate a first guest;
compile the first project into the first executable code;
instruct the first guest to execute the first job including the first executable code;
determine, by the debugger, that the first job failed to execute based on a first error executing the first executable code;
determine, by the debugger, a first programming language of the first project;
update, by the debugger, the first project by inserting a first breakpoint in the first programming language based on the first error;
save, by the debugger, the updated first project as a second project in the source code repository;
instruct a second guest to execute a second job, wherein the second job is a copy of the first job with the first executable code replaced by a second executable code compiled from the second project; and
pause execution of the second job at the first breakpoint in the second executable code.

13. The system of claim 12, wherein the first guest executes in at least one of a continuous integration and a continuous development environment.

14. The system of claim 12, wherein executing the first job includes executing a third executable code compiled from a third project of the plurality of source code projects, and the third project is written in a different programming language from the first project.

15. The system of claim 14, wherein executing the third executable code triggers a second error, and the debugger inserts a second breakpoint into one of the third project and a fourth project that is a copy of the third project prior to re-executing the first job.

16. The system of claim 12, wherein the job scheduler is further configured to:
receive a second request to execute a third job different from the first job, wherein executing the third job includes executing the first executable code;
instantiate a third guest;
compile the first project into the first executable code;
instruct the third guest to execute the second job including the first executable code; and
upon completion of the second job, reclaim compute resources associated with the third guest by terminating the third guest.

17. The system of claim 12, wherein the first guest is prevented from being terminated after failing to execute the first job, and the second guest is the first guest.

18. The system of claim 17, wherein the first job includes a plurality of tasks including a first task and a second task, and the first guest imports a result of executing the first task when executing the second job rather than re-executing the first task.

19. The system of claim 12, wherein a copy of the first project is saved as part of a first configuration of the first job, and the first configuration of the first job is overwritten by a second configuration of the second job with a copy of the second project replacing the copy of the first project.

20. The system of claim 12, wherein the second guest is suspended after pausing execution of the second executable code.

* * * * *